United States Patent
Hu et al.

(10) Patent No.: US 11,432,015 B2
(45) Date of Patent: *Aug. 30, 2022

(54) ADAPTIVE LOOP FILTERING ACROSS RASTER-SCAN SLICES

(71) Applicant: QUALCOMM Incorporated, San Diego, CA (US)

(72) Inventors: Nan Hu, San Diego, CA (US); Vadim Seregin, San Diego, CA (US); Adarsh Krishnan Ramasubramonian, Irvine, CA (US); Muhammed Zeyd Coban, Carlsbad, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/921,106

(22) Filed: Jul. 6, 2020

(65) Prior Publication Data

US 2021/0014537 A1 Jan. 14, 2021

Related U.S. Application Data

(60) Provisional application No. 62/873,174, filed on Jul. 11, 2019.

(51) Int. Cl.
*H04N 19/80* (2014.01)
*H04N 19/119* (2014.01)
(Continued)

(52) U.S. Cl.
CPC ........... *H04N 19/80* (2014.11); *H04N 19/119* (2014.11); *H04N 19/172* (2014.11); *H04N 19/174* (2014.11); *H04N 19/176* (2014.11)

(58) Field of Classification Search
None
See application file for complete search history.

(56) References Cited

U.S. PATENT DOCUMENTS

| 2012/0106624 A1* | 5/2012 | Huang | H04N 19/86 |
| | | | 375/E7.126 |
| 2013/0128981 A1* | 5/2013 | Kazui | H04N 19/117 |
| | | | 375/240.16 |

(Continued)

OTHER PUBLICATIONS

Bross B., et al., "Versatile Video Coding (Draft 5)", 14. JVET Meeting, Mar. 19, 2019-Mar. 27, 2019, Geneva, (The Joint Video Exploration Team of ISO/IEC JT C1 /SC29/WG11 and ITU-T SG.16), No. JVET-N1001, Jul. 2, 2019 (Jul. 2, 2019), XP030220731 , 406 pages, Retrieved from the Internet: URL: http://phenix.int-evry.fr/jvet/doc_end_user/documents/14_Geneva/wg11/JVET-N1001-v10.zip JVET-N1001-v10.docx. [retrieved on Jul. 2, 2019] cited in the application abstract Sections 3. 1, 7.3, 7.4.

(Continued)

*Primary Examiner* — Mohammad J Rahman
(74) *Attorney, Agent, or Firm* — Polsinelli LLP

(57) ABSTRACT

Systems, methods, and media are provided for loop filtering across raster scan slices. One example includes obtaining data comprising one or more pictures, including obtaining a first block located in a first slice of one of the pictures. The example then includes determining a second block is located in a second slice of the picture, the second block including one or more pixels for use in performing loop filtering of a pixel of the first block, and determining that loop filtering across slice boundaries is disabled. Based on this disabling, the example determines that the one or more pixels of the second block are unavailable for performing loop filtering of the pixel of the first block, and duplicates at least one pixel (Continued)

of the first block or at least one pixel of an additional block of the first slice for performing loop filtering of the pixel of the first block.

29 Claims, 18 Drawing Sheets

(51) Int. Cl.
*H04N 19/172* (2014.01)
*H04N 19/174* (2014.01)
*H04N 19/176* (2014.01)

(56) References Cited

U.S. PATENT DOCUMENTS

| | | | | |
|---|---|---|---|---|
| 2014/0198844 | A1* | 7/2014 | Hsu | H04N 19/70 |
| | | | | 375/240.07 |
| 2014/0204999 | A1* | 7/2014 | Park | H04N 19/82 |
| | | | | 375/240.02 |
| 2018/0160113 | A1* | 6/2018 | Jeong | H04N 19/593 |
| 2018/0270480 | A1* | 9/2018 | Zhang | H04N 19/86 |
| 2020/0077092 | A1* | 3/2020 | Lin | H04N 19/82 |
| 2020/0120359 | A1* | 4/2020 | Hanhart | H04N 19/105 |
| 2020/0186812 | A1* | 6/2020 | Shinozawa | H04N 19/159 |
| 2020/0228843 | A1* | 7/2020 | Lin | H04N 19/117 |
| 2020/0260120 | A1* | 8/2020 | Hanhart | H04N 19/82 |
| 2021/0067784 | A1 | 3/2021 | Hu et al. | |
| 2021/0076033 | A1 | 3/2021 | Hu et al. | |
| 2021/0136407 | A1* | 5/2021 | Aono | H04N 19/563 |
| 2021/0274223 | A1* | 9/2021 | Lim | H04N 19/82 |

OTHER PUBLICATIONS

Hu (Qualcomm) N., et al., "AHG12/Non-CE5: Unification of Boundary Handling for Adaptive Loop Filter", 15. JVET Meeting, Jul. 3, 2019-Jul. 12, 2019, Gothenburg, (The Joint Video Exploration Team of ISO/IEC JTC1/SC29/WG11 and ITU-TSG.16), No. JVET-O0654, Jul. 6, 2019 (Jul. 6, 2019), XP030220178, Retrieved from the Internet: URL: http://phenix.int-evry.fr/jvet/doc_end_user/documents/15_Gothenburg/wg11/JVET-O0654-v3.zip JVET-O0654-v3.docx, [retrieved on Jul. 6, 2019], p. 1, paragraphs 1, 2.
International Search Report and Written Opinion—PCT/US2020/041070—ISAEPO—dated Sep. 21, 2020.

\* cited by examiner

| | | | 362 C9 | | |
|---|---|---|---|---|---|
| | | 348 C8 | 360 C10 | 372 C5 | |
| | 338 C3 | 346 C7 | 358 C11 | 370 C4 | 378 C1 |
| 332 C0 | 336 C2 | 344 C6 | 356 C12 | 368 C6 | 376 C2 | 380 C0 |
| | 334 C1 | 342 C5 | 354 C11 | 366 C8 | 374 C3 |
| | | 340 C4 | 352 C10 | 364 C7 | |
| | | | 350 C9 | | |

| | | 318 C4 | | |
|---|---|---|---|---|
| | 308 C3 | 316 C5 | 324 C3 | |
| 302 C0 | 306 C2 | 314 C6 | 322 C2 | 326 C0 |
| | 304 C1 | 312 C5 | 320 C1 | |
| | | 310 C4 | | |

ADAPTIVE LOOP FILTERING ACROSS RASTER-SCAN SLICES

CROSS-REFERENCE TO RELATED APPLICATIONS

This application claims the benefit of U. S. Provisional Application No. 62/873,174, filed Jul. 11, 2019, which is hereby incorporated by reference, in its entirety and for all purposes.

TECHNICAL FIELD

The present disclosure generally relates to video coding. In some examples, aspects of the present disclosure relate to adaptive loop filter (ALF) operations and to ALF filtering across raster-scan slices.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include versatile video coding (VVC), high-efficiency video coding (HEVC), advanced video coding (AVC), moving picture experts group (MPEG) coding, VP9, Alliance of Open Media (AOMedia) Video 1 (AV1), among others. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

SUMMARY

Disclosed are systems, apparatuses, methods, and computer-readable media for performing adaptive loop filter (ALF) operations. For example, techniques are described herein for performing improved ALF filtering across raster-scan slices (also referred to as L-shaped slices). In one illustrative example, a method of processing video data is provided. The method includes: obtaining video data comprising one or more pictures; obtaining a first block of a picture from the one or more pictures, the first block being located in a first slice of the picture; determining a second block is located in a second slice of the picture, the second block including one or more pixels for use in performing loop filtering of a pixel of the first block; determining loop filtering across slice boundaries is disabled; determining, based on the second block being located in the second slice and the loop filtering across slice boundaries being disabled, that the one or more pixels of the second block are unavailable for performing loop filtering of the pixel of the first block; and duplicating, based on the one or more pixels of the second block being unavailable for performing loop filtering of the pixel of the first block, at least one pixel of the first block or at least one pixel of an additional block of the first slice for performing loop filtering of the pixel of the first block.

In another example, an apparatus is provided that includes a memory and one or more processors (e.g., configured in circuitry) and coupled to the memory. The one or more processors are configured to: obtain video data comprising one or more pictures; obtain a first block of a picture from the one or more pictures, the first block being located in a first slice of the picture; determine a second block is located in a second slice of the picture, the second block including one or more pixels for use in performing loop filtering of a pixel of the first block; determine loop filtering across slice boundaries is disabled; determine, based on the second block being located in the second slice and the loop filtering across slice boundaries being disabled, that the one or more pixels of the second block are unavailable for performing loop filtering of the pixel of the first block; and duplicate, based on the one or more pixels of the second block being unavailable for performing loop filtering of the pixel of the first block, at least one pixel of the first block or at least one pixel of an additional block of the first slice for performing loop filtering of the pixel of the first block.

In another example, a non-transitory computer-readable storage medium is provided that includes instructions stored thereon which, when executed by one or more processors, cause the one or more processors to: obtain video data comprising one or more pictures; obtain a first block of a picture from the one or more pictures, the first block being located in a first slice of the picture; determine a second block is located in a second slice of the picture, the second block including one or more pixels for use in performing loop filtering of a pixel of the first block; determine loop filtering across slice boundaries is disabled; determine, based on the second block being located in the second slice and the loop filtering across slice boundaries being disabled, that the one or more pixels of the second block are unavailable for performing loop filtering of the pixel of the first block; and duplicate, based on the one or more pixels of the second block being unavailable for performing loop filtering of the pixel of the first block, at least one pixel of the first block or at least one pixel of an additional block of the first slice for performing loop filtering of the pixel of the first block.

In another example, an apparatus is provided that includes: means for obtaining video data comprising one or more pictures; means for obtaining a first block of a picture from the one or more pictures, the first block being located in a first slice of the picture; means for determining a second block is located in a second slice of the picture, the second block including one or more pixels for use in performing loop filtering of a pixel of the first block; means for determining loop filtering across slice boundaries is disabled; means for determining, based on the second block being located in the second slice and the loop filtering across slice boundaries being disabled, that the one or more pixels of the second block are unavailable for performing loop filtering of the pixel of the first block; and means for duplicating, based on the one or more pixels of the second block being unavailable for performing loop filtering of the pixel of the first block, at least one pixel of the first block or at least one pixel of an additional block of the first slice for performing loop filtering of the pixel of the first block.

In some aspects, loop filtering for the first block is performed using an adaptive loop filter (ALF).

In some aspects, the at least one pixel of the first block or the at least one pixel of the additional block of the first slice comprise one or more pixels of a slice closest to the second block.

In some aspects, the first slice is a raster scan slice and the second block is located at a bottom-right corner of the first block. In some aspects, the first slice is a raster scan slice and the second block is located at a bottom-left corner of the first block. In other aspects, the second block is located at a top-left corner of the first block. In still further aspects, the second block is located at a top-right corner of the first block or a bottom-left corner of the first block.

In some aspects where the second block is located at a bottom-right corner of the first block, the at least one pixel of the first block or the at least one pixel of the additional block of the first slice comprise one or more pixels of a left-neighboring block in the first slice of the second block closest to the second block.

In some cases, the at least one pixel of the first block or the at least one pixel of the additional block of the first slice comprise one or more pixels of a top-neighboring block in the first slice of the second block closest to the second block.

In some aspects, the at least one pixel of the first block or the at least one pixel of the additional block of the first slice comprise one or more pixels of a left-neighboring block in the first slice of the second block closest to the second block and one or more pixels of a top-neighboring block in the first slice of the second block closest to the second block.

In some aspects, the first block comprises a first coding tree unit (CTU) and the second block comprises a second CTU.

In some aspects, the first slice and the second slice are obtained from raster scan partitioning of the picture.

In some aspects, the method, apparatuses, and computer-readable medium described above include generating an encoded video bitstream comprising the one or more pictures.

In some aspects, the encoded video bitstream is generated based on the video data and a result of applying at least one filter to the first block.

In some aspects, the method, apparatuses, and computer-readable medium described above include sending the encoded video bitstream to a decoding device, the encoded video bitstream being sent with signaling information, the signaling information comprising at least a clip flag and an adaptive loop filter flag.

In some aspects, the method, apparatuses, and computer-readable medium described above include storing the encoded video bitstream.

In some aspects, the method, apparatuses, and computer-readable medium described above include: obtaining an encoded video bitstream comprising the one or more pictures; identifying signaling information associated with the encoded video bitstream, the signaling information comprising at least an adaptive loop filter flag and an indication that the loop filtering across slice boundaries is disabled; and decoding the first block of the picture from the encoded video bitstream.

In some aspects, decoding the first block of the picture from the encoded video bitstream comprises reconstructing the first block of the picture. In some aspects, the method, apparatuses, and computer-readable medium described above include applying at least one filter to the reconstructed first block.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each example.

The foregoing, together with other features and embodiments, will become more apparent upon referring to the following specification, examples, and accompanying drawings.

BRIEF DESCRIPTION OF THE DRAWINGS

In order to describe the manner in which the disclosed and other advantages and features of the disclosure can be obtained, a more particular description of the principles described above will be rendered by reference to specific embodiments thereof which are illustrated in the appended drawings. Understanding that these drawings depict only example embodiments of the disclosure and are not to be considered to limit its scope, the principles herein are described and explained with additional specificity and detail through the use of the drawings in which:

FIG. 3A is a diagram illustrating an example of chroma filter configuration, in accordance with some examples of the present disclosure;

FIG. 3B is a diagram illustrating an example of luma filter configuration, in accordance with some examples of the present disclosure;

DETAILED DESCRIPTION

Figure 1:
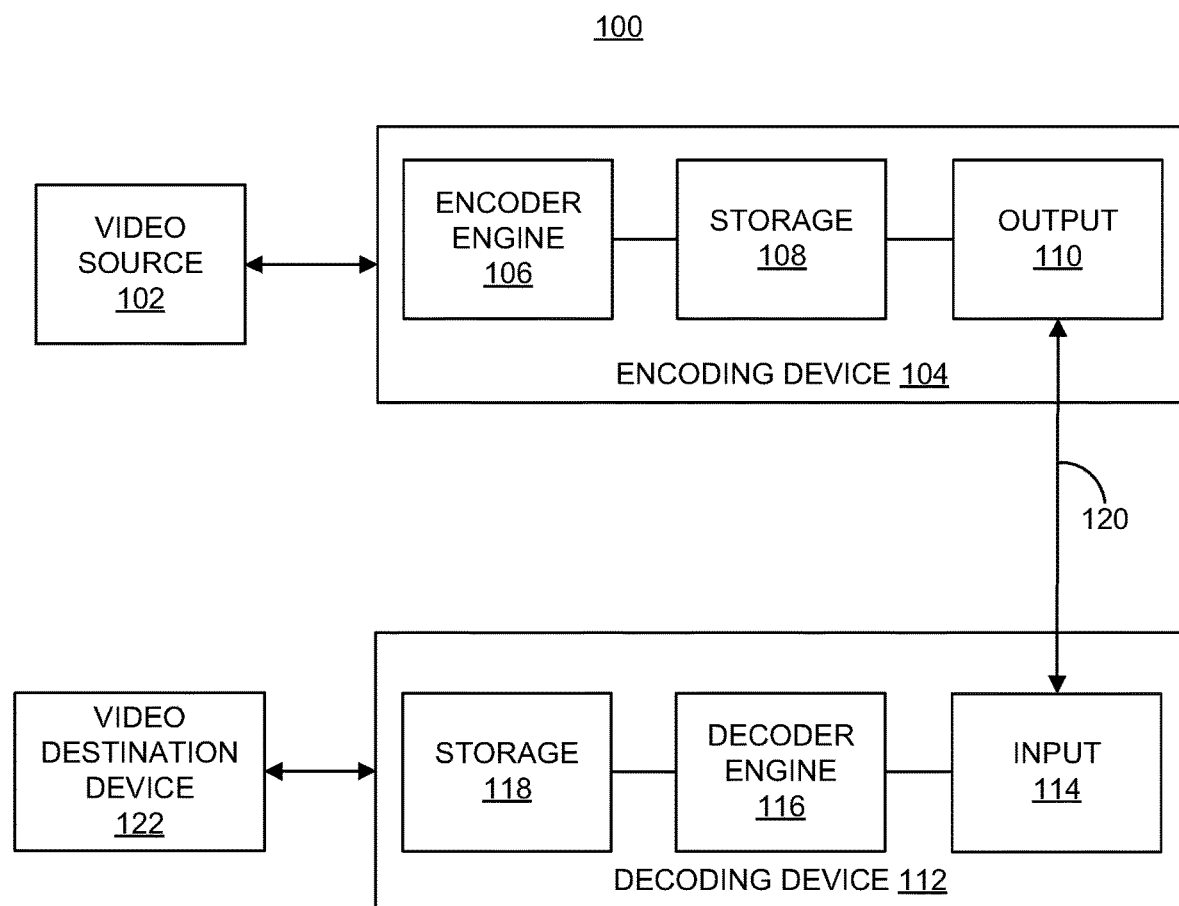
FIG. 1 is a block diagram illustrating an example of an encoding device and a decoding device, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

Examples described herein address issues with filtering (e.g., Adaptive Loop Filter (ALF)) implementations that can cause errors and decrease performance in video processing systems. As described herein, loop filters (e.g., ALF filters among other types of loop filters) use a filter pattern to apply filter operations to pixels of images. In some systems, pictures in a video stream can be structured as slices in a raster-scan configuration. In such systems, ALF can be enabled or disabled, and when ALF is enabled, the use of pixels across slice boundaries for ALF can similarly be enabled or disabled. Other types of loop filters may be similarly configured with respect to slice boundaries. With data organized in blocks for a raster scan, the interface between slices in a raster scan can sometimes include four blocks that intersect at a shared corner, where three of the four blocks are part of one slice, and one of the four blocks is part of a separate slice. In such configurations of a raster-scan system, when ALF (and/or other loop filtering) is enabled with the use of pixels across slice boundaries disabled, the ALF operations can encounter a configuration where the filter pattern is not configured to address the disallowed pixels which are across the slice boundary. This configuration can cause fault errors that terminate video processing operations for a picture, or can otherwise degrade performance. Examples described herein improve the operation of video processing devices (e.g., encoding and decoding hardware) by improving functionality of raster-scan operations, preventing system faults, and improving performance of video processing systems.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended examples. While ALF filtering is used herein for illustrative purposes, the techniques described herein can be applied to other types of loop filters, such as Sample Adaptive Offset (SAO) filters, deblocking filters, and/or other types of filters.

Video coding devices can implement video compression techniques to encode and decode video data efficiently. Video compression techniques can include applying different prediction modes, including spatial prediction (e.g., intra-frame prediction or intra-prediction), temporal prediction (e.g., inter-frame prediction or inter-prediction), inter-layer prediction (across different layers of video data and/or other prediction techniques to reduce or remove redundancy inherent in video sequences), among others. A video encoder can partition each picture of an original video sequence into rectangular regions referred to as video blocks or coding units and described in greater detail below. These video blocks can be encoded using a particular prediction mode.

In some cases, video blocks can be divided in one or more ways into one or more groups of smaller blocks. Blocks can include coding tree blocks, prediction blocks, transform blocks, and/or other suitable blocks. References generally to a "block", unless otherwise specified, may refer to such video blocks (e.g., coding tree blocks, coding blocks, prediction blocks, transform blocks, or other appropriate blocks or sub-blocks, as would be understood by one of ordinary skill). These blocks may also interchangeably be referred to herein as "units" (e.g., coding tree unit (CTU), coding unit (CU), prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder can restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder can determine a prediction error. In some examples, the prediction can be determined as the difference between the pixel values in the block being encoded and the predicted block. The prediction error can also be referred to as the residual. The video encoder can also apply a transform to the prediction error (e.g., a discrete cosine transform (DCT) or other suitable transform) to generate transform coefficients. After transformation, the video encoder can quantize the transform coefficients. The quantized transform coefficients and motion vectors can be represented using syntax elements and, along with control information, form a coded representation of a video sequence. In some instances, the video encoder can entropy code syntax elements, thereby further reducing the number of bits used for their representation.

A video decoder can, using the syntax elements and control information discussed above, construct predictive data (e.g., a predictive block) for decoding a current frame. For example, the video decoder can add the predicted block and the compressed prediction error. The video decoder can determine the compressed prediction error by weighting the transform basis functions using the quantized coefficients. The difference between the reconstructed frame and the original frame is called reconstruction error.

The techniques described herein can simplify and increase the efficiency of adaptive loop filters used in video coding when raster-scan configurations are used and the use of pixel data across slice boundaries is disabled for adaptive loop filtering. In some examples, the techniques herein can decrease the complexity of such calculations, reduce encoding and decoding errors, and minimize the processing burden on a device's compute resources. Moreover, the techniques described herein can be applied to any video codecs (e.g., High Efficiency Video Coding (HEVC), Advanced Video Coding (AVC), or other suitable existing video codec), and/or can be an efficient coding tool for any video coding standards, including current video coding standards, video standards being developed, and/or future video coding standards, such as, for example, Versatile Video Coding (VVC), the joint exploration model (JEM), and/or other video coding standards in development or to be developed.

FIG. 1 is a block diagram illustrating an example system 100 including an encoding device 104 and a decoding device 112. The encoding device 104 can be part of a source device, and the decoding device 112 can be part of a receiving device. The source device and/or the receiving device can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, a head-mounted display (HMD), and/or any other suitable electronic device. In some examples, the source device and the receiving device can include one or more wireless transceivers for wireless communications. The coding techniques described herein can apply to video coding in various multimedia applications including, for example, streaming video transmissions (e.g., over the Internet), television broadcasts or transmissions, encoding of digital video for storage on a data storage medium, decoding of digital video stored on a data storage medium, and/or other applications. In some examples, system 100 can support one-way or two-way video transmission to support applications such as video conferencing, video streaming, video playback, video broadcasting, gaming, video telephony, etc.

The encoding device 104 (or encoder) can be used to encode video data using a video coding standard or protocol to generate an encoded video bitstream. Examples of video coding standards include ITU-T H. 261; ISO/IEC MPEG-1 Visual; ITU-T H. 262 or ISO/IEC MPEG-2 Visual; ITU-T H. 263, ISO/IEC MPEG-4 Visual; ITU-T H. 264 (also known as ISO/IEC MPEG-4 AVC), including its Scalable Video Coding (SVC) and Multiview Video Coding (MVC) extensions; and High Efficiency Video Coding (HEVC) or ITU-T H. 265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (WET) to explore and develop new video coding tools for the next generation of video coding standard, named Versatile Video Coding (VVC). The reference software is called VVC Test Model (VTM). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others).

Various aspects described herein provide examples using the VTM, VVC, HEVC, and/or extensions thereof. However, the techniques and systems described herein can also be applicable to other coding standards, such as AVC, MPEG, JPEG (or other coding standard for still images), extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 can provide the video data to the encoding device 104. The video source 102 can be part of the source device, or can be part of a device other than the source device. The video source 102 can include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 can include one or more input pictures. Pictures may also be referred to as "frames." A picture or frame is a still image that, in some cases, is part of a video. In some examples, data from the video source 102 can be a still image that is not a part of a video. In HEVC, VVC, and other video coding specifications, a video sequence can include a series of pictures. A picture can include three sample arrays, denoted SL, SCb, and SCr. SL is a two-dimensional array of luma samples, SCb is a two-dimensional array of Cb chrominance samples, and SCr is a two-dimensional array of Cr chrominance samples. Chrominance samples may also be referred to herein as "chroma" samples. In other instances, a picture may be monochrome and may only include an array of luma samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS.

An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H. 264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non- VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units can contain a sequence of bits forming a coded representation of the video data (e.g., an encoded video bitstream, a CVS of a bitstream, or the like), such as coded representations of pictures in a video. The encoder engine 106 can generate coded representations of pictures by partitioning each picture into multiple slices. A slice can be independent of other slices so that information in the slice is coded without dependency on data from other slices within the same picture. A slice includes one or more slice segments including an independent slice segment and, if present, one or more dependent slice segments that depend on previous slice segments.

In HEVC, the slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and, in some cases, can be square in shape. For example, a size of a CU can include 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some examples, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs can be partitioned to be non-square in shape. Syntax data associated with a CU can also describe, for example, partitioning of the CU into one or more TUs according to a CTU. A TU can be square or non-square in shape.

According to the HEVC standard, transformations can be performed using transform units (TUs). TUs may vary for different CUs. The TUs can be sized based on the size of PUs within a given CU. The TUs may be the same size or smaller than the PUs. In some examples, residual samples corresponding to a CU can be subdivided into smaller units using a quadtree structure known as residual quad tree (RQT). Leaf nodes of the RQT may correspond to TUs. Pixel difference values associated with the TUs can be transformed to produce transform coefficients. The transform coefficients can then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode can include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction can be made, for example, at the CU level.

The encoder engine 106 and decoder engine 116 (described in more detail below) can be configured to operate according to VVC. In VVC, a video coder (such as encoder engine 106 and/or decoder engine 116) can partition a picture into a plurality of coding tree units (CTUs). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks can be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. Inter-picture prediction uses the temporal correlation between pictures in order to derive a motion-compensated prediction for a block of image samples. Using a translational motion model, the position of a block in a previously decoded picture (a reference picture) is indicated by a motion vector $(\Delta x, \Delta y)$, with $\Delta x$ specifying the horizontal displacement and $\Delta y$ specifying the vertical displacement of the reference block relative to the position of the current block. In some cases, a motion vector $(\Delta x, \Delta y)$ can be in integer sample accuracy (also referred to as integer accuracy), in which case the motion vector points to the integer-pel grid (or integer-pixel sampling grid) of the reference frame. In some cases, a motion vector $(\Delta x, \Delta y)$ can be of fractional sample accuracy (also referred to as fractional-pel accuracy or non-integer accuracy) to more accurately capture the movement of the underlying object, without being restricted to the integer-pel grid of the reference frame.

Accuracy of motion vectors can be expressed by the quantization level of the motion vectors. For example, the quantization level can be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$, refIdx$_0$ and $\Delta x_1$, $y_1$, refIdx$_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$, refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 can then perform transformation and quantization. For example, following prediction, the encoder engine 106 can calculate residual values corresponding to the PU. Residual values can include pixel difference values between the current block of pixels being coded (the PU) and the prediction block used to predict the current block (e.g., the predicted version of the current block). For example, after generating a prediction block (e.g., using inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block can be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which can be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) can be applied to residual data in each CU. In some examples, a TU can be used for the transform and quantization processes implemented by the encoder engine 106. A given CU having one or more PUs may also include one or more TUs. As described in further detail below, the residual values may be transformed into transform coefficients using the block transforms, and may be quantized and scanned using TUs to produce serialized transform coefficients for entropy coding.

In some examples following intra-predictive or inter-predictive coding using PUs of a CU, the encoder engine 106 can calculate residual data for the TUs of the CU. The PUs can include pixel data in the spatial domain (or pixel domain). The TUs can include coefficients in the transform domain following application of a block transform. As previously noted, the residual data may correspond to pixel difference values between pixels of the unencoded picture and prediction values corresponding to the PUs. Encoder engine 106 can form the TUs including the residual data for the CU, and can then transform the TUs to produce transform coefficients for the CU.

The encoder engine 106 can perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream can then be entropy encoded by the encoder engine 106. In some examples, the encoder engine 106 can utilize a predefined scan order to scan the quantized transform coefficients to produce a serialized vector that can be entropy encoded. In some examples, encoder engine 106 can perform an adaptive scan. After scanning the quantized transform coefficients to form a vector (e.g., a one-dimensional vector), the encoder engine 106 can entropy encode the vector. For example, the encoder engine 106 can use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 can send the NAL units making up the encoded video bitstream data over the communications link 120 to the decoding device 112 of the receiving device. The input 114 of the decoding device 112 can receive the NAL units. The communications link 120 can include a channel provided by a wireless network, a wired network, or a combination of a wired and wireless networks. A wireless network can include any wireless interface or combination of wireless interfaces and can include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network can include any wired interface (e.g., fiber, ethernet, powerline ethernet, ethernet over coaxial cable, digital signal line (DSL), or the like). The wired and/or wireless networks can be implemented using various equipment and/or components, such as base stations, routers, access points, bridges, gateways, switches, servers, software containers, virtual machines, or the like. The encoded video bitstream data can be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, one or more nodes in a distributed storage system, or any other suitable digital storage media for storing encoded video data.

The input 114 of the decoding device 112 receives the encoded video bitstream data and can provide the video bitstream data to the decoder engine 116, or to storage 118 for later use by the decoder engine 116. The decoder engine 116 can decode the encoded video bitstream data by entropy decoding (e.g., using an entropy decoder) and extracting the elements of one or more coded video sequences making up the encoded video data. The decoder engine 116 can rescale and perform an inverse transform on the encoded video bitstream data. Residual data is passed to a prediction stage of the decoder engine 116. The decoder engine 116 then predicts a block of pixels (e.g., a PU). In some examples, the prediction is added to the output of the inverse transform (the residual data).

The decoding device 112 can output the decoded video to a video destination device 122, which can include a display or other output device for displaying the decoded video data. In some aspects, the video destination device 122 can be part of the receiving device that includes the decoding device 112. In some aspects, the video destination device 122 can be part of a separate device other than the receiving device.

In some examples, the video encoding device 104 and/or the video decoding device 112 can be integrated with an audio encoding device and audio decoding device, respectively.

The video encoding device 104 and/or the video decoding device 112 can also include other hardware or software used to implement the coding techniques described herein, such as one or more microprocessors, digital signal processors (DSPs), application-specific integrated circuits (ASICs), field programmable gate arrays (FPGAs), central processing units (CPUs), discrete logic, software, hardware, firmware or any combinations thereof. In some cases, the video encoding device 104 and the video decoding device 112 can be integrated as part of a combined encoder/decoder (codec) in a respective device. An example of specific details of the encoding device 104 is described below with reference to FIG. 12. An example of specific details of the decoding device 112 is described below with reference to FIG. 13.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . , n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some examples, the VPS, SPS, or PPS may be transmitted in-band with the encoded bitstream. In some examples, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

Figure 2A:
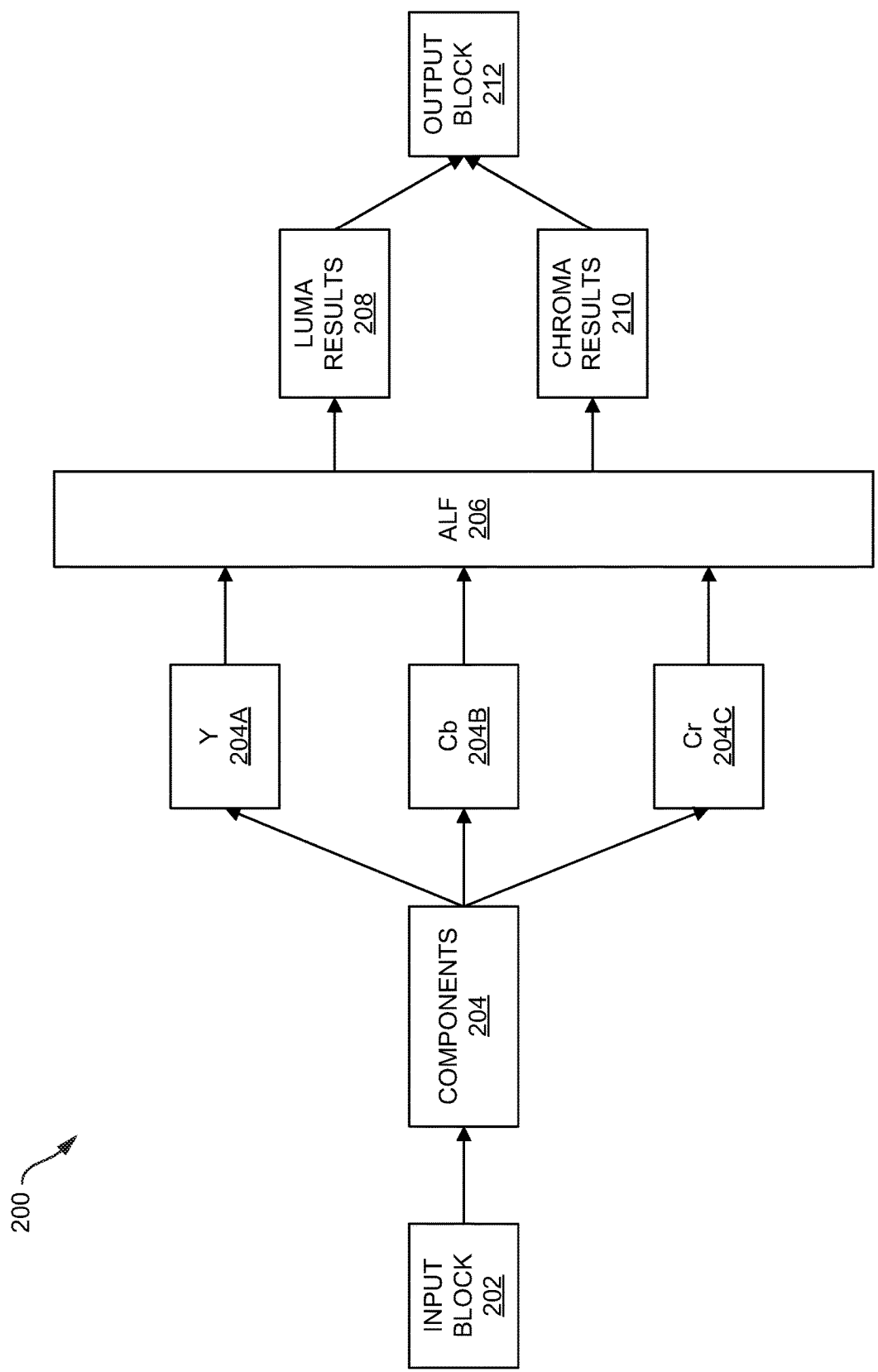
FIG. 2A is a simplified diagram illustrating an example system for applying an adaptive loop filter (ALF), in accordance with some examples of the present disclosure.

FIG. 2A is a simplified diagram illustrating an example system 200 for applying an ALF 206 to an input block 202 in a frame. The block 202 can include color components 204 for image pixels representing the block 202. In this example, the color components 204 are in the YCbCr color space and can include luma Y, chroma Cb, and chroma Cr components. The chroma Cb and chroma Cr components in the YCbCr color space can respectively represent the blue-difference and red-difference chroma signals associated with the block 202.

An ALF 206 with ALF filter coefficient values can be applied to luma (Y) component samples 204A, chroma (Cb) component samples 204B, and chroma (Cr) component samples 204C in the block 202. In some examples, the ALF 206 with the ALF filter coefficient values can be applied to samples (e.g., 204A, 204B, 204C) on a block-by-block basis (e.g., to specific video blocks). For example, the video encoder or decoder can process blocks in a frame individually and, when processing a block (e.g., 202) in the frame, the video encoder or decoder can apply ALF filter coefficient from the ALF 206 to that block. The video encoder or decoder can similarly apply ALF filter coefficient values to other blocks as it processes those blocks.

In some examples, the ALF 206 can be applied to the luma (Y) component samples 204A, the chroma (Cb) component samples 204B, and the chroma (Cr) component samples 204C to correct artifacts in the block 202, reduce the error between the original frame and the reconstructed frame, and/or increase the quality of the decoded video signal.

Moreover, the ALF 206 can include one or more filters, and each filter can have a specific filter size and shape, as further described below with respect to FIGS. 3A and 3B. For example, the ALF 206 can include a filter of a certain size and shape used for luma (Y) filtering and a filter of a certain size and shape for chroma filtering. As previously explained, in some examples, the ALF 206 can be applied at the block level. For example, in some cases, the ALF 206 can be applied at the CTU or CU level. In other examples, the ALF 206 can be applied at a frame level and/or to other portions of a frame.

A luma filtering result 208 can be obtained from the ALF 206 applied to the luma (Y) component samples 204A. Similarly, a chroma filtering result 210 can be obtained from the ALF 206 applied to the chroma (Cb) component samples 204B and the chroma (Cr) component samples 204C. The luma filtering result 208 can include filtered luma values for the output block 212, and the chroma filtering result 210 can include filtered chroma Cb and chroma Cr values for the output block 212. The output block 212 can include a reconstructed block and/or frame including the luma, chroma Cb and chroma Cr values from the luma filtering result 208 and the chroma filtering result 210. In some cases, the output block 212 along with other output blocks similarly processed can be used to generate a reconstructed frame with ALF filtering.

In some examples, at the encoder side, the luma filtering result 208 and the chroma filtering result 210 can be used to determine whether luma and chroma ALF filtering should be enabled. For example, the quality of the reconstructed block and/or frame after ALF filtering can be compared with the quality of the reconstructed block and/or frame before ALF filtering. ALF filtering can then be enabled or disabled based on the quality of the reconstructed block and/or frame after ALF filtering relative to the quality of the reconstructed block and/or frame before ALF filtering. An ALF flag can then be signaled with the encoded bitstream to indicate whether ALF filtering is enabled or disabled for the block. In some cases, the ALF flag can specify whether luma ALF filtering is enable or disabled, whether luma and chroma ALF filtering are enabled or disabled, or whether ALF filtering is disabled altogether. At the decoder side, the decoder can use the ALF flag to determine whether to perform ALF filtering for the block in the reconstructed image and/or the reconstructed image.

Figure 2B:
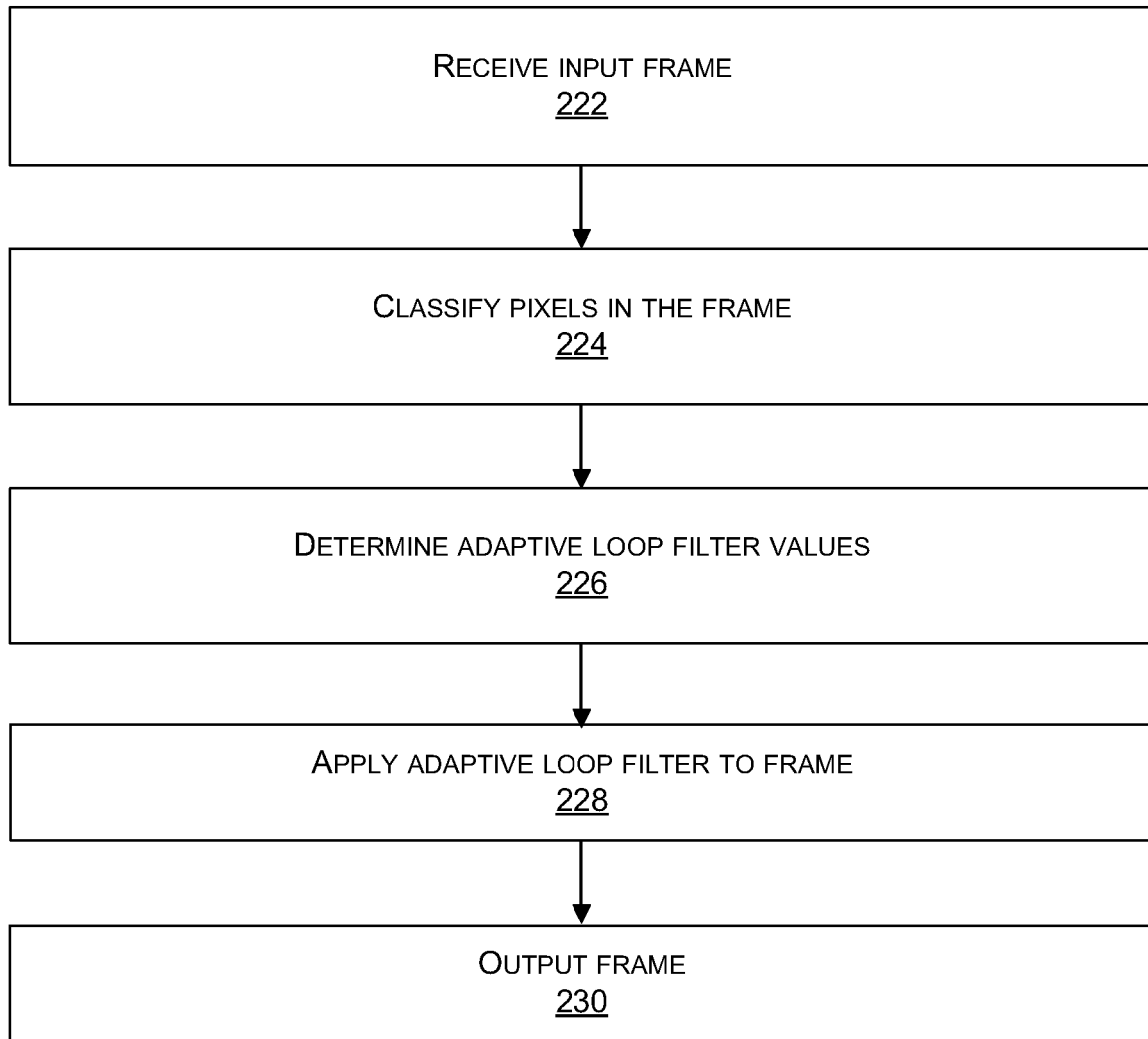
FIG. 2B is a flowchart of an example method for ALF filtering in accordance with some examples of the present disclosure.

FIG. 2B is a flowchart of an example method 220 for ALF filtering with modifications for filtering near raster-scan slice boundaries when filtering with pixels from across raster-scan slice boundaries is disables. In various examples, the operations of method 220 can be performed by an encoding or a decoding device (e.g., a video processing device). In this example, at block 222, the video processing device can receive an input frame. The input frame can include color components, such as luma and chroma components, as previously explained. In some examples, the input frame can include blocks in a frame encoded by the encoding device 104 prior to the ALF filtering. In some examples, the input frame can be a frame associated with an image and/or a video sequence.

At block 224, the encoding device 104 can classify luma components in the frame. In some examples, the encoding device 104 can also classify chroma components in the frame. The classification can be applied to a luma component at a block level (e.g., at a 4×4 block level) or at a sample level (for each sample of the frame). In some cases, the classification can include classifying the direction and activity for each block or sample associated with each luma component in the frame. In some examples, for the luma component, 4×4 blocks in the whole frame, where N represents a number greater than 0, can be classified based on a 1D Laplacian direction (e.g., up to 5 directions) and 2D Laplacian activity (e.g., up to 5 activity values). In some cases, the encoding device 104 can calculate a direction $Dir_b$ and an unquanitzed activity $Act_b$. In some cases, $Act_b$ can be further quantized to a range of 0 to 4, inclusively.

As described herein, examples can include limitations on use of cross-slice boundary data. This disabling of loop filtering across slice boundaries can include limits on data that would be used in classification operations. As described in detail below, examples can use duplicate pixels from the slice that a central group of pixels is in to replace data from pixels that are across a slice boundary from the central group of pixels when performing classification operations for raster-scan data where cross-slice data use is disabled. Additional details of such duplication operations are described below.

In some cases, values of two diagonal gradients, in addition to the horizontal and vertical gradients used in an existing ALF, can be calculated using a 1D Laplacian. As it can be seen from Equations (1) to (4) below, the sum of gradients of all pixels within an 8×8 window that covers a target pixel can be employed as the represented gradient of the target pixel, where R(k,l) is the reconstructed pixel(s) at location (k,l) and indices i and j refer to the coordinates of the upper-left pixel in the 4×4 block (e.g., from the 4×4 blocks in the frame). Each pixel is associated with four gradient values, with a vertical gradient denoted by gv, a horizontal gradient denoted by $g_h$, a 135 degree diagonal gradient denoted by $g_{d1}$, and a 45 degree diagonal gradient denoted by $g_{d2}$.

$$g_v = \sum_{k=i-2}^{i+5} \sum_{l=j-2}^{j+5} V_{k,l}, \qquad \text{Equation (1)}$$

$V_{k,l}$=|2R(k,l)−R(k,l−1)−R(k,l+1)| when both of k and j are even numbers or both of k and j are not even numbers; 0, otherwise.

$$g_h = \sum_{k=i-2}^{i+5} \sum_{l=j-2}^{j+5} H_{k,l}, \qquad \text{Equation (2)}$$

$H_{k,l}$=|2R(k,l)−R(k−1,l)−R(k+1, l)| when both of k and j are even numbers or both of k and j are not even numbers; 0, otherwise.

$$g_{d1} = \sum_{k=i-2}^{i+5} \sum_{l=j-3}^{j+5} D1_{k,l}, \qquad \text{Equation (3)}$$

$D1_{k,l}$=|2(k,l)−R(k−1, l+1)−R(k+1, l+1)| when both of k and j are even numbers or both of k and j are not even numbers; 0, otherwise.

$$g_{d2} = \sum_{k=i-2}^{i+5} \sum_{j=j-2}^{j+5} D2_{k,l}, \qquad \text{Equation (4)}$$

$D2_{k,l}$=|2(k,l)−R(k−1, l+1)−R(k+1, l+1)| when both of k and j are even numbers or both of k and j are not even numbers; 0, otherwise.

To assign the directionality $Dir_b$, the ratio of the maximum and minimum of the horizontal and vertical gradients, denoted by $R_{h,v}$ in Equation (5) below, and the ratio of the maximum and minimum of two diagonal gradients, denoted by $R_{d0,d1}$ in Equation (6) (can also be denoted as $R_{d1,d2}$ in some cases), are compared against each other with two thresholds $t_1$ and $t_2$.

$$R_{h,v} = g_{h,v}^{max}/g_{h,v}^{min}$$

wherein $g_{h,v}^{max} = \max(g_h, g_v), g_{h,v}^{min} = \min(g_h, g_v),$  Equation (5)

$$R_{d0,d1} = g_{d0,d1}^{max}/g_{d0,d1}^{min}$$

wherein $g_{d0,d1}^{max} = \max(g_{d0}, g_{d1}), g_{d0,d1}^{min} = \min(g_{d0}, g_{d1})$  Equation (6)

By comparing the detected ratios of the horizontal and vertical gradients and the diagonal gradients, five direction modes (e.g., $Dir_b$ within the range of [0, 4] inclusive), are defined in Equation (7) below. The values of $Dir_b$ and its physical meaning are described in Table 1 below.

$$D = \begin{cases} 0 & R_{h,v} \le t_1 \ \&\& \ R_{d0,d1} \le t_1 \\ 1 & R_{h,v} > t_1 \ \&\& \ R_{h,v} > R_{d0,d1} \ \&\& \ R_{h,v} > t_2 \\ 2 & R_{h,v} > t_1 \ \&\& \ R_{h,v} > R_{d0,d1} \ \&\& \ R_{h,v} \le t_2 \\ 3 & R_{d0,d1} > t_1 \ \&\& \ R_{h,v} \le R_{d0,d1} \ \&\& \ R_{d0,d1} > t_2 \\ 4 & R_{d0,d1} > t_1 \ \&\& \ R_{h,v} \le R_{d0,d1} \ \&\& \ R_{d0,d1} \le t_2 \end{cases}$$  Equation (7)

TABLE 1

Values of Direction and Its Physical Meaning

| Direction Values | Physical Meaning |
|---|---|
| 0 | Texture |
| 1 | Strong Horizontal/Vertical |
| 2 | Horizontal/Vertical |
| 3 | Strong Diagonal |
| 4 | Diagonal |

The activity value Act can be calculated as:

$$\text{Act} = \sum_{k=i-2}^{i+5} \sum_{l=j-2}^{j+5} (V_{k,l} + H_{k,l}).$$  Equation (8)

In some cases, the Act value can be further quantized to the range of 0 to 4 inclusive, and the quantized value is denoted as $\hat{A}$. The quantization process from activity value Act to activity index $\hat{A}$ is described below.

The quantization process can be defined as follows:

avg_var=Clip_post(NUM_ENTRY−1, (Act*ScaleFactor)>>shift);

$\hat{A}$=ActivityToIndex[avg_var],  Equation (9)

where NUM_ENTRY is set to 16 (or other suitable value), ScaleFactor is set to 64 (or other suitable value), shift is (4+internal coded-bitdepth) or other suitable value, ActivityToIndex[NUM_ENTRY]={0, 1, 2, 2, 2, 2, 2, 3, 3, 3, 3, 3, 3, 3, 3, 4} or other suitable set of values, and function Clip_post(a, b) returns the smaller value between a and b.

In total, each 4×4 luma block can be categorized into one out of 25 (5×5) classes and an index is assigned to each 4×4 block according the value of $Dir_b$ and $Act_b$ of the block. The group index can be denoted as C and can be set equal to $5Dir_b + \hat{A}$, where $\hat{A}$ is the quantized value of $Act_b$.

At block 226, the processing device can determine ALF coefficient values for the ALF, and at block 228, the encoding device 104 can apply the ALF filter to the frame. In some examples, the ALF filter shapes can determine the number of coefficients that will influence the filtering process. Non-limiting example filter shapes can include 5×5, 7×7, and 9×9 diamond shapes. FIGS. 3A and 3B illustrate example ALF filters that can be applied for chroma and luma filtering.

With reference to FIG. 3A, an example filter 300 for chroma filtering is shown. The filter 300 in this example is a 5×5 filter and has a diamond shape. The filter 300 includes cells 302 through 326 for 13 input chroma samples. The cells 302 through 326 include coefficient values (e.g., C0 through C6) to be applied to corresponding chroma samples. Each cell (302 through 326) can include a filter coefficient value that is applied to a chroma sample associated with that cell.

With reference to FIG. 3B, an example filter 330 for luma filtering is shown. The filter 330 in this example is a 7×7 filter and has a diamond shape. The filter 330 includes cells 332 through 380 for 25 input luma samples. The cells 332 through 380 include coefficient values (e.g., C0 through C12) to be applied to corresponding luma samples. Each cell (332 through 380) can include a filter coefficient value that is applied to a luma sample associated with that cell.

In some examples, a 5×5 filter, such as filter 300 shown in FIG. 3A can be applied to chroma components, and a 7×7 filter, such as filter 330 shown in FIG. 3B, can be applied to the luma component.

For example, with reference to FIG. 3A, each cell (302 through 326) in the filter 300 can have a filter coefficient f(k,l), and each of these values in the cell can be applied to a corresponding pixel. In some cases, the center of the filter 300 (e.g., cell 314) can be placed on or applied to a pixel and the remaining cells (e.g., cells 302-312 and 316-326) of the filter 300 can be placed on or applied to surrounding or neighboring pixels.

Moreover, with reference to FIG. 3B, each cell (332 through 380) in the filter 330 can have a filter coefficient f(k,l), and each of these values in the cell can be applied to a corresponding pixel. In some cases, the center of the filter 330 (e.g., cell 356), can be placed on or applied to a pixel and the remaining cells (e.g., cells 332-354 and 358-380) of the filter 330 can be placed on or applied to surrounding or neighboring pixels. In both cases, example implementations can have a configuration to block application of filter values to pixels across slice boundaries. In such implementations, values for the filter positions that are blocked by the cross-slice limitations are needed to prevent errors in the operations of the filter. For example, if cells 338, 346, and 348 are configured to be applied to pixels in a slice that is different than the pixels for the remaining portions of the filter (e.g., the filter is operating at a corner between slices as part of raster-scan operations as discussed below for FIG. 4A), then replacement values are needed for those cell locations in the filter, since the filter is blocked from accessing the corresponding pixels (e.g., due to the limit on applying ALF across slice boundaries). Examples described herein provide such replacement values by duplicating values from pixels in the same slice, and using those in filter positions in place of the data from cross-slice pixels that are not available.

At block 230, the video processing device can generate an output frame. The output frame can include a reconstructed image after the ALF filtering. The output frame can include pixel values for luma and chroma components, calculated based on the filter coefficients, as previously explained.

In some examples, the pixel values generated for samples by the ALF filtering method 220 can be compared with the pixel values of the original samples to determine whether luma and chroma filtering should be enabled. For example, if the luma filtering results provide better image quality than the original luma samples, the encoding device 104 can enable luma filtering for the frame. If the chroma filtering results provide better image quality than the original chroma samples, processing device can enable chroma filtering for the frame.

In some cases, the processing device can signal an ALF flag with an encoded bitstream. The signaled ALF flag can indicate to the processing device whether ALF filtering is enabled or disabled for a particular frame. Such signaling can also be used to indicate whether ALF filtering (e.g., when enabled) is allowed to access pixel data from across slice boundaries.

Returning to FIG. 2B, when the output frame is generated by an encoding device (e.g., device 104), the image data can be transmitted to a decoding device 112 in an encoded bitstream. The encoded bitstream can include signaling information, as previously explained. The decoding device 112 can receive the encoded bitstream, decode the bitstream, and use the signaling information to apply ALF filtering for frames in the bitstream when such filtering is enabled.

Figure 2C:
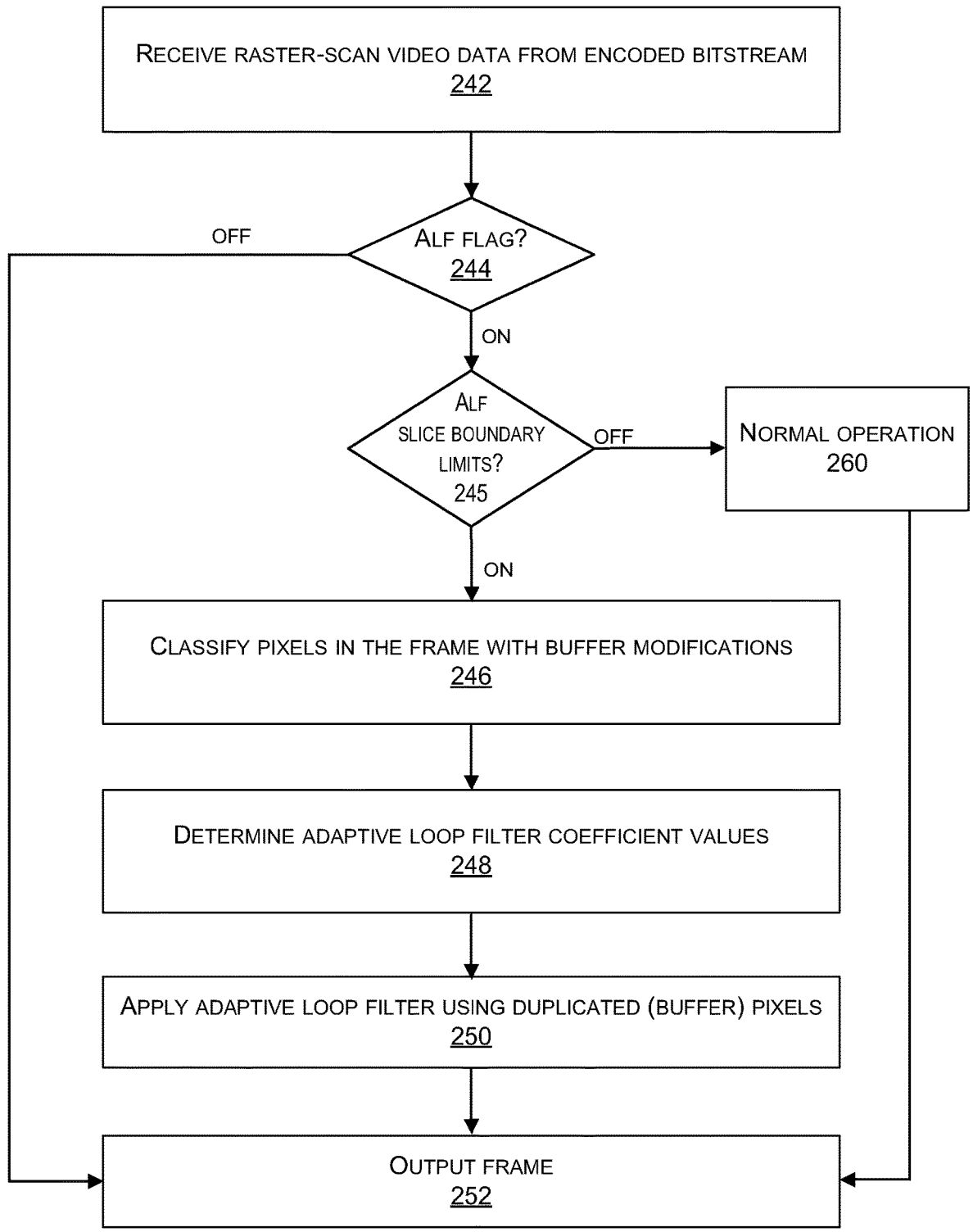
FIG. 2C is a flowchart illustrating an example method for ALF filtering, in accordance with some examples of the present disclosure.

FIG. 2C is a flowchart illustrating an example method 240 for ALF filtering implemented by a decoding device 112. In this example, at block 242, the decoding device 112 can receive a frame from the encoded bitstream provided by the encoding device 104. In some cases, the frame can be a reconstructed or decoded frame from the encoded bitstream.

Moreover, in some examples, the frame can include luma and chroma components, as previously explained.

At block 224, the decoding device 112 can determine if an ALF flag signaled with the frame is on or off. If the ALF flag is off, indicating the ALF filtering is disabled, the decoding device 112 can output the frame at block 252. The ALF flag can indicate whether luma filtering is enabled (or disabled), whether both luma filtering and chroma filtering is enabled (or disabled), or whether a luma and/or chroma component is enabled (or disabled). If luma filtering is enabled, the ALF filtering performed by the decoding device 112 as described herein can include luma filtering. If luma and chroma filtering are both enabled, the ALF filtering performed by the decoding device 112 as described herein can include both luma and chroma filtering. If chroma filtering is enabled, the ALF filtering performed by the decoding device 112 as described herein can include chroma filtering. If the ALF flag is on, indicating the ALF filtering is enabled for any aspect of the video stream, at block 245, the decoding device 112 can check for a flag to determine whether the enabled ALF filtering is allowed to use data from another slice across slice boundaries. If the use of such data is enabled, the processing can proceed in a standard fashion, with the filter cells (e.g., as illustrated in FIGS. 3A and 3B) using the corresponding position pixel data, in operations 260. If limits are enabled (e.g., on) that prevent such cross slice pixel data use during ALF filtering, then the decoding device 112 proceeds with operations modified to prevent errors in raster-scan ALF filtering with cross-slice pixel use disabled in block 245, with the decoding device 112 configured to can classify pixels in the frame. These operations can use replacement (e.g., duplicate) pixels as described further below.

At block 248, the decoding device 112 can determine ALF coefficients for each pixel in the frame, and at block 250 the decoding device 112 can apply the ALF filters with the ALF coefficients to the frame. The decoding device 112 can determine and apply the ALF coefficients as previously explained with respect to blocks 226 and 228 shown in FIG. 2B, including the use of duplicate pixel data where needed to prevent errors where data from across slice boundaries is disabled.

At block 252, the decoding device 112 can generate an output frame. If the ALF flag was off at block 244, the output frame can include a reconstructed image without the ALF filtering. If the ALF flag was on at block 244, the output frame can include a reconstructed image after the ALF filtering. The output frame can include pixel values for luma and chroma components, calculated based on the filter coefficients, as previously explained. When pixel data for ALF filtering from across slice boundaries is disabled, the calculations can also be based on duplicated pixel data from the slice containing the pixel being processed (e.g., duplicates from in-slice pixel).

As described in more detail below, when loop filtering across slice boundaries is disabled, certain pixels for loop filtering are not available for loop filtering operations. These loop filtering operations include classification operations (e.g., in block 224 and block 246) as well as the filters applied in blocks 228 and 250. Thus, examples described herein for duplicating pixels to replace unavailable pixels can be performed both for the classification filtering operations as well as for determining loop filter values to be applied as part of filtering (e.g., ALF) of image data.

Figure 4A:
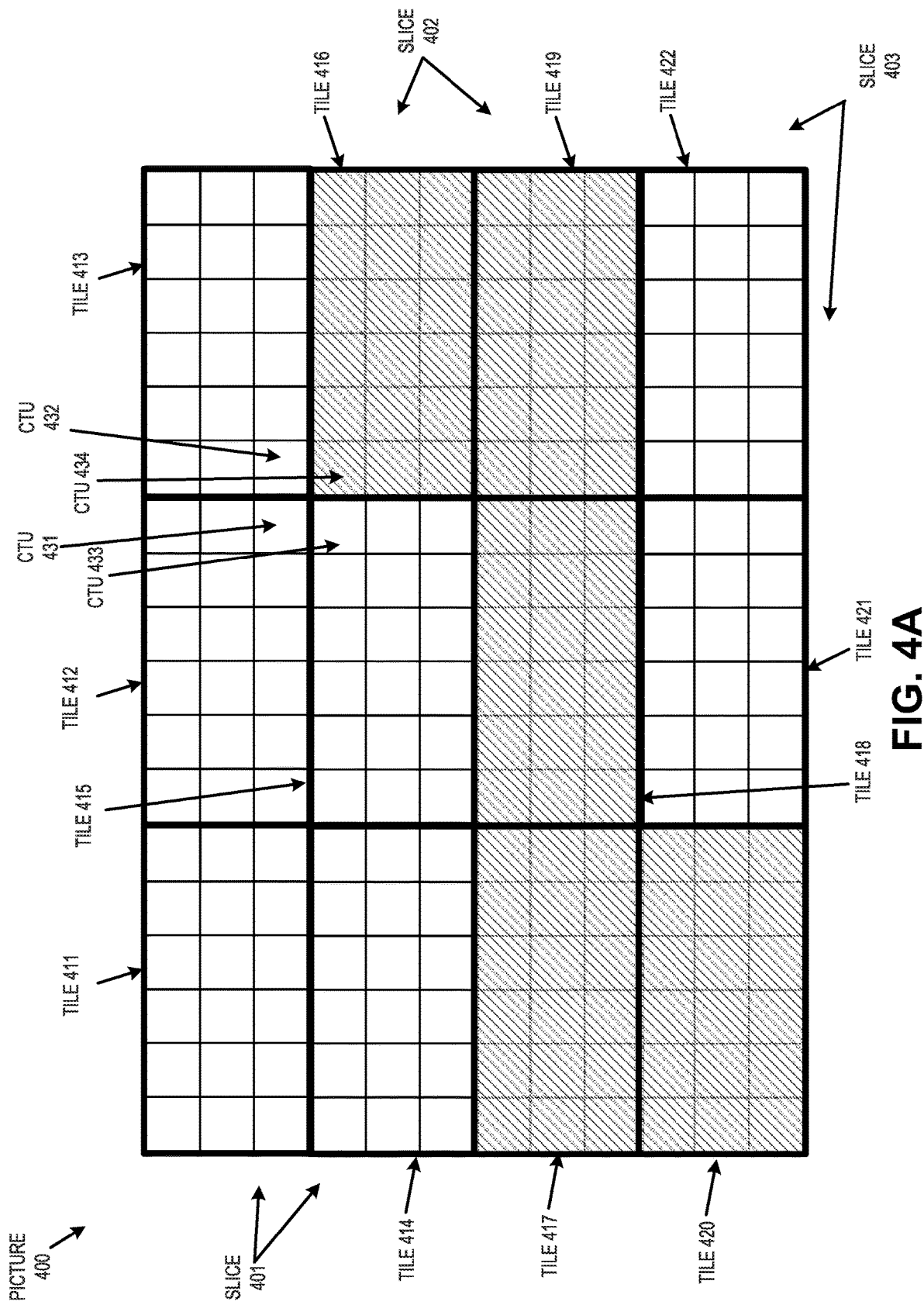
FIG. 4A is a diagram illustrating aspects of a raster-scan configuration in accordance with some examples.

FIG. 4A is a diagram illustrating a picture 400 with a raster-scan configuration, where slices 402, 402, and 403 of picture 400 can include tiles in different rows. As illustrated, picture 400 includes tiles 411, 412, 412, 414, 414, 415, 416, 417, 418, 419, 420, 421, and 422. These 12 tiles each include CTUs, and are divided among the illustrated slices. Slice 401 includes tiles 411-415, slice 402 includes tiles 416-420, and slice 403 includes tiles 421 and 422. For tiles and CTUs, which border tiles and CTUs in other slices, the edge is considered a boundary with the other slices. For example, tiles 412, 413, and 415 share a slice boundary with tile 416 at the corner with CTU 431, CTU 432, CTU 433, and CTU 434.

Figure 4B:
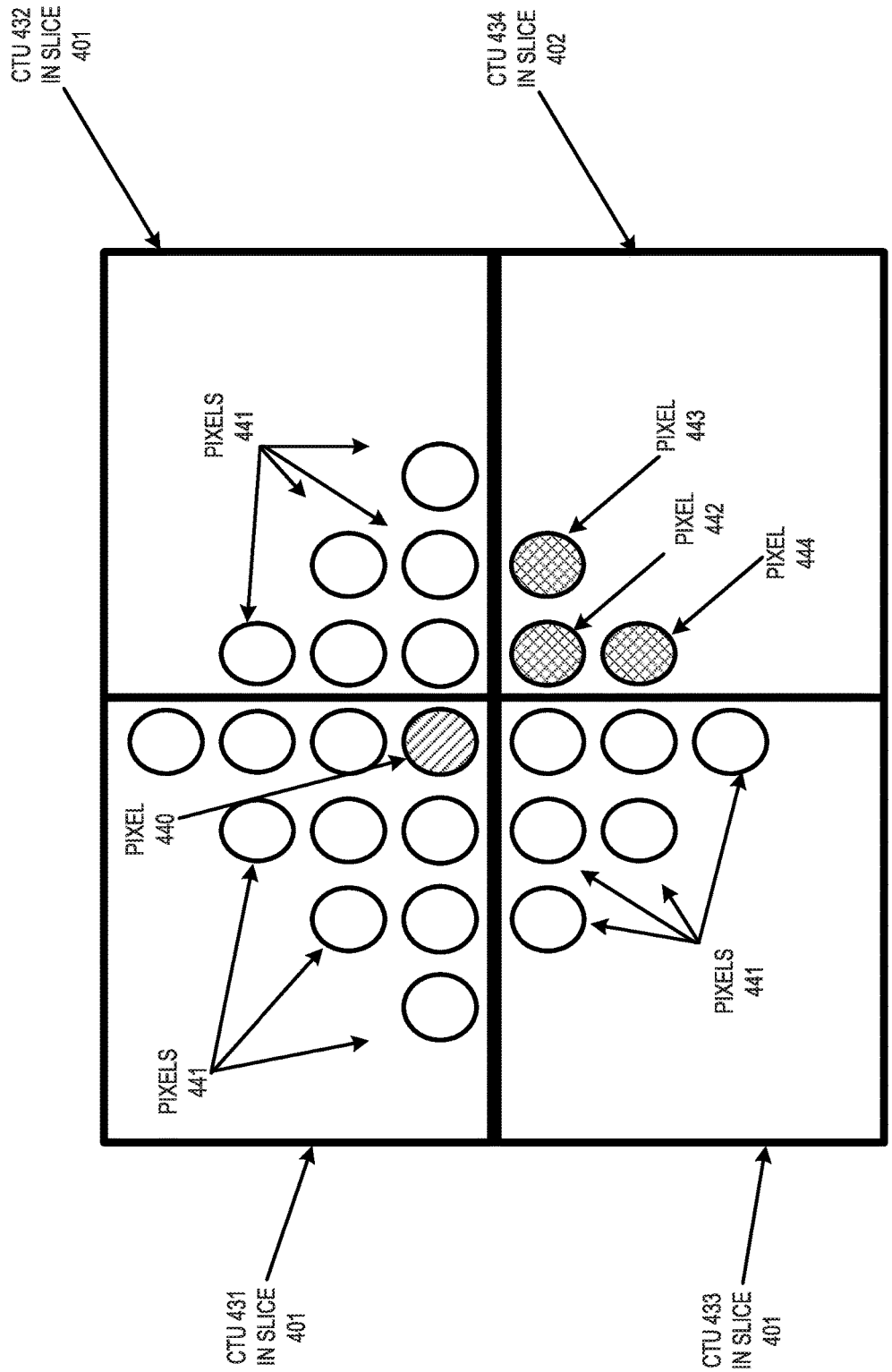
FIG. 4B-FIG. 4D are conceptual diagrams illustrating an example of a filter pattern for ALF filtering at a corner of a raster-scan slice (also referred to as an L-shaped slice), in accordance with some examples.

FIG. 4B is a diagram illustrating additional details of the slice boundary, showing the four CTUs 431-434 at the boundary between slice 401 and 402, with CTUs 431, 432, and 433 in slice 401 and CTU 434 in slice 402. Within each CTU are pixels with image data (e.g., luma and chroma) organized in a grid based on the specific CTU, tile, and slice structure of the picture 400. When an ALF filter is applied (e.g., a 7×7 filter as illustrated with the center of the filter applied at pixel 440), a loop is performed to apply the filter at each pixel. The filter as applied at each pixel uses not only the pixel, but the surrounding pixels, to process the image data and improve image quality. In some examples, for more efficient operation, ALF filters can be blocked from using pixel data from other slices. When all pixels in the filter pattern are in the same slice, this does not cause an issue.

Figure 4C:
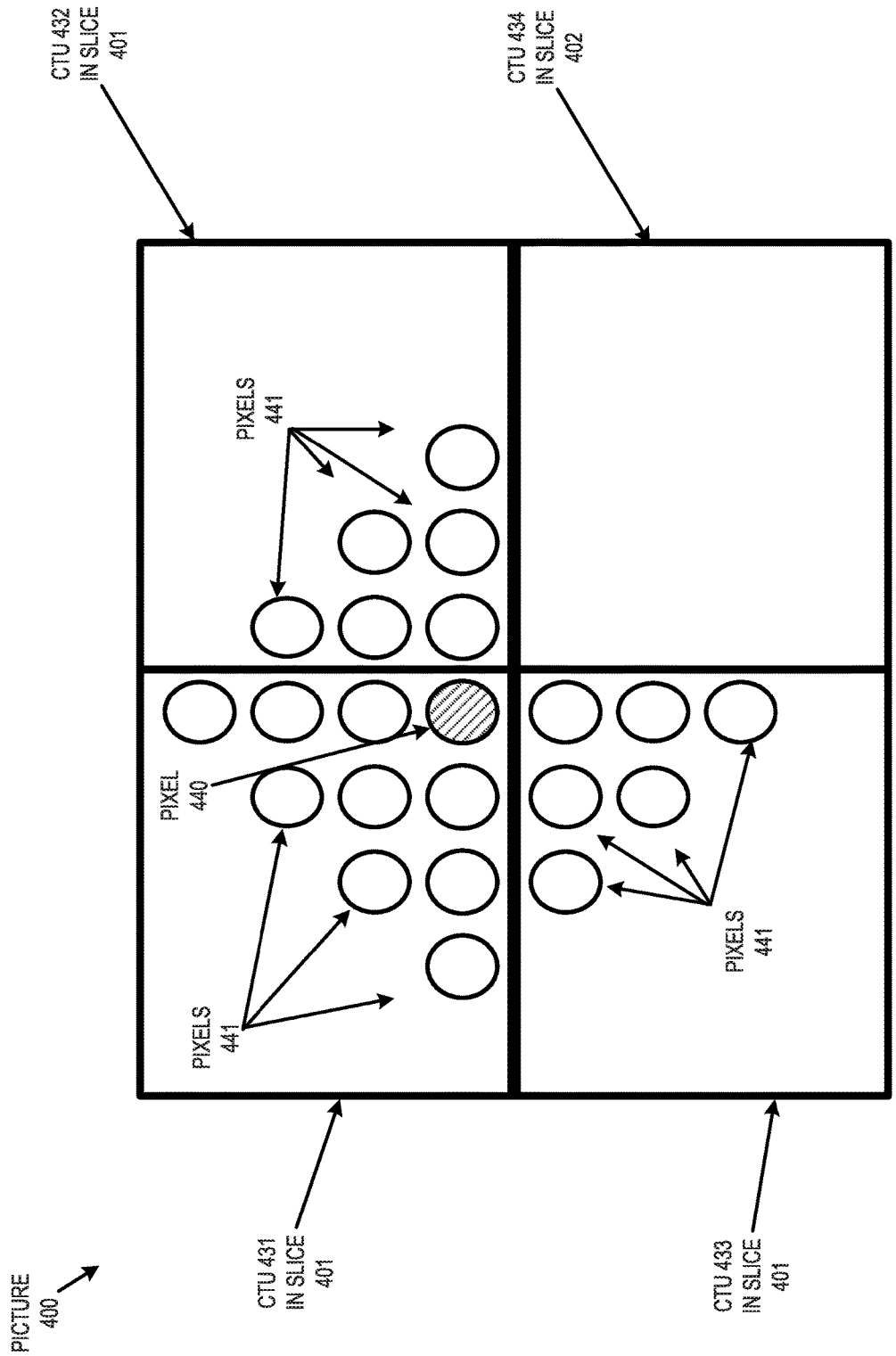

As illustrated, however, at the corner of slice 401 and 402, pixels 442, 443, and 444 are in slice 402, and the remaining pixels 440 and 441 are in slice 401. When the filter with the illustrated 7×7 is set to be applied with pixels at a bottom-right corner of CTU 431 (e.g., pixel 440 in FIG. 4B) at the center of the filter pattern, the filter is not able to use the image data for pixels 442-444 when ALF is disabled across slice boundaries. This disabling of the filtering pixel 440 across slice boundaries is illustrated in FIG. 4C, with the pixels from CTU 434 in slice 402 unavailable for use with the other pixels 440 and 441 for ALF filtering. Without data for this cross-boundary slice portion of the filter data, an error will occur, as the filter cannot operate correctly without data in all cells (e.g., cells as illustrated in FIGS. 3A and 3B).

Various techniques can be used to address such an issue. In on example, unavailable pixels from across a slice boundary can be replaced in the filter with duplicated pixels from a closest pixel in an above CTU. The above CTU can be referred to as the above-neighboring CTU across the slice boundary. In this case, the above neighboring CTU for CTU 434 would be CTU 432.

Figure 4D:
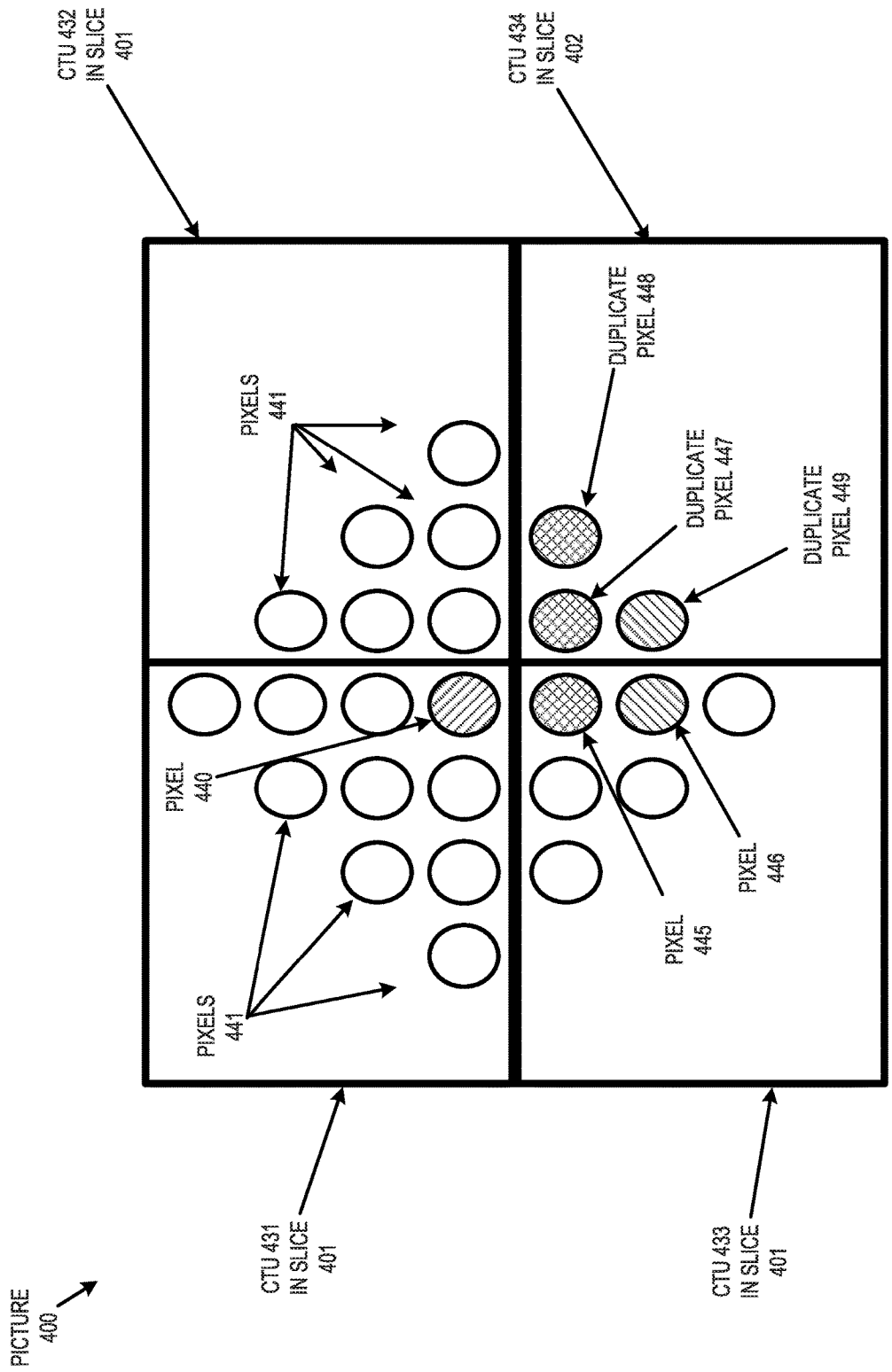
Figure 6:
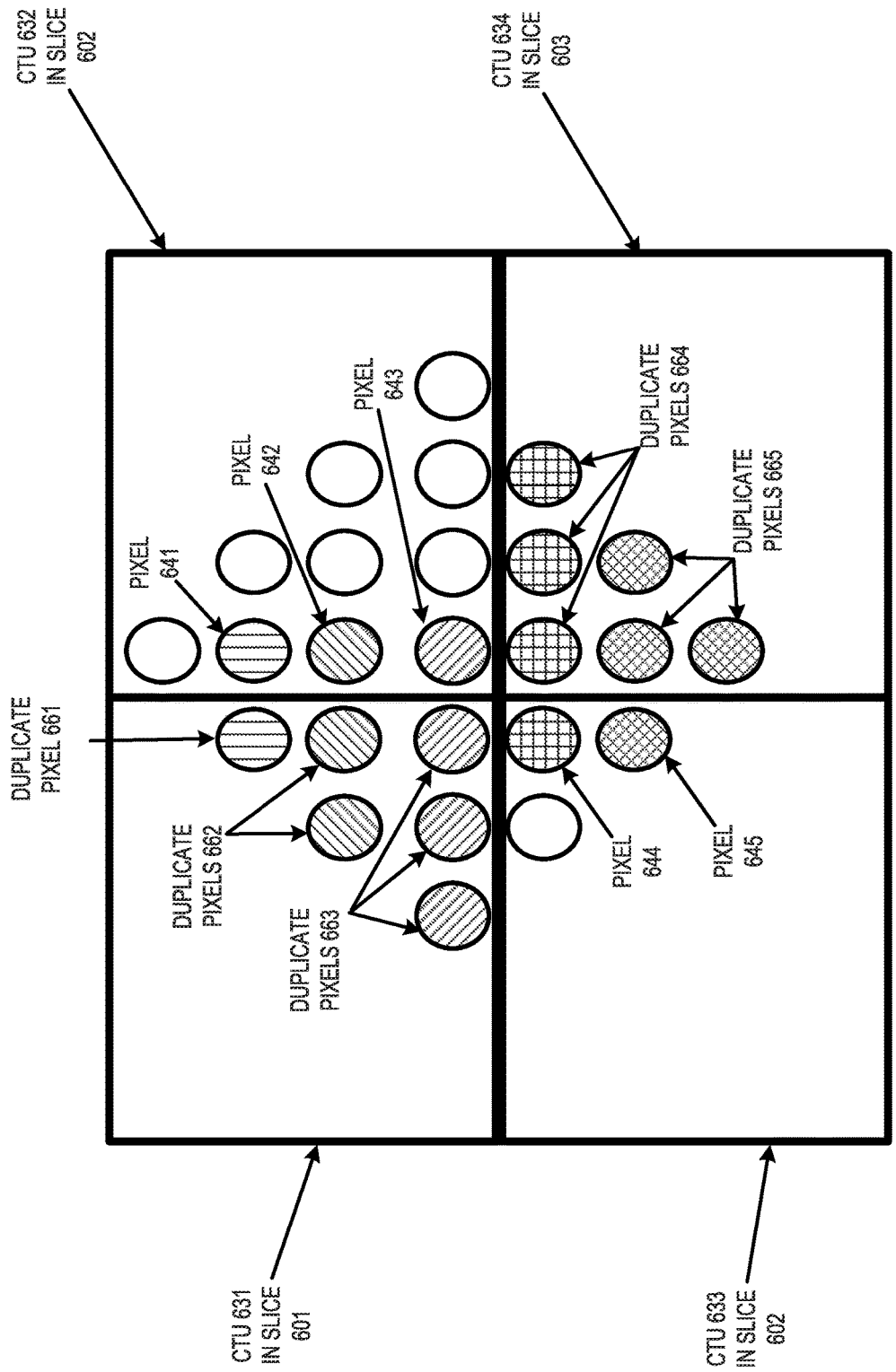
FIG. 6 is a conceptual diagram illustrating an example of a filter pattern for ALF filtering at a corner of a multiple slice boundary, in accordance with some examples.

In a second example, unavailable pixels from CTU 434 can duplicate the unavailable pixels in the closest pixel in a left CTU to the left of the CTU that includes the unavailable pixels. The left CTU can also be referred to as the left-neighboring CTU across the slice boundary. In FIG. 4C, the CTU with unavailable pixels is CTU 434, and the left-neighboring CTU for CTU 434 is CTU 433. FIG. 4D particularly illustrates this example. As shown in FIG. 4D, the missing pixels from CTU 433 for the illustrated filter pattern are replaced with duplicates of the closest pixels from the left-neighboring CTU. In this case, the closest pixel in the left-neighbor CTU 443 for missing pixels 442 and 443 is pixel 445, and the closest pixel in the left-neighbor CTU 443 for missing pixel 444 is pixel 446. To provide data for the filter to allow the filter to operate, pixel 445 is used to generate duplicate pixel 447 and duplicate pixel 448, and pixel 446 is used to generate duplicate pixel 449. Duplicating the closest pixel from a left neighboring pixel (or a right neighboring pixel, as illustrated in FIG. 6 and possible in other a raster-scan or L-shaped slice boundaries) simplifies calculations to generate missing data for an ALF filter, while also allowing the filter to function with minimal impact on the image quality generated by filter operations. Such an operation can be simply implemented, with pixel data at an (x,y) coordinate replaced with pixel data at a (closest in-slice x,y) coordinate when the conditions that make pixels unavailable to a filter apply. For example, in FIG. 4D, if a pixel at an (x, y) coordinate is unavailable (pixels in CTU 434), the (closest in-slice x,y) is equal to (x of pixel 440, y).

In addition to the above examples (e.g., using closest pixels from a neighbor CTU), other implementations are also possible. In another example, unavailable pixels in CTU 434 may be set equal to a linear combination of one pixel from the above-neighbor CTU (e.g., CTU 432) and one pixel from the left-neighbor CTU (e.g., CTU 433) as p=(wL*pL+wA*pA)/(wL+wA), where wL and wA are two weights, which may depend on the distance to the neighboring CTU (e.g., pixel 449 will have a different distance to CTU 432 and CTU 433), and where pL and pA are pixels from the left CTU and the above CTU, respectively.

In an additional example, a mix of the above examples can be used. For example, a closest pixel from either neighbor can be used. In such an example, pixel 449 could use data from slice 433, and pixel 448 could use data from slice 432. In such an example, pixel 447 can use data from a default CTU position (e.g., left, above, right, below, etc.) or can use a linear combination of the closest pixels. In still further examples, pixels not in a current CTU row (or other block row) may be padded symmetrically or asymmetrically, pixels not in a current CTU column (or other block column) may be padded symmetrically or asymmetrically, or unavailable pixels in a CTU may be derived by applying intra prediction.

Figure 5:
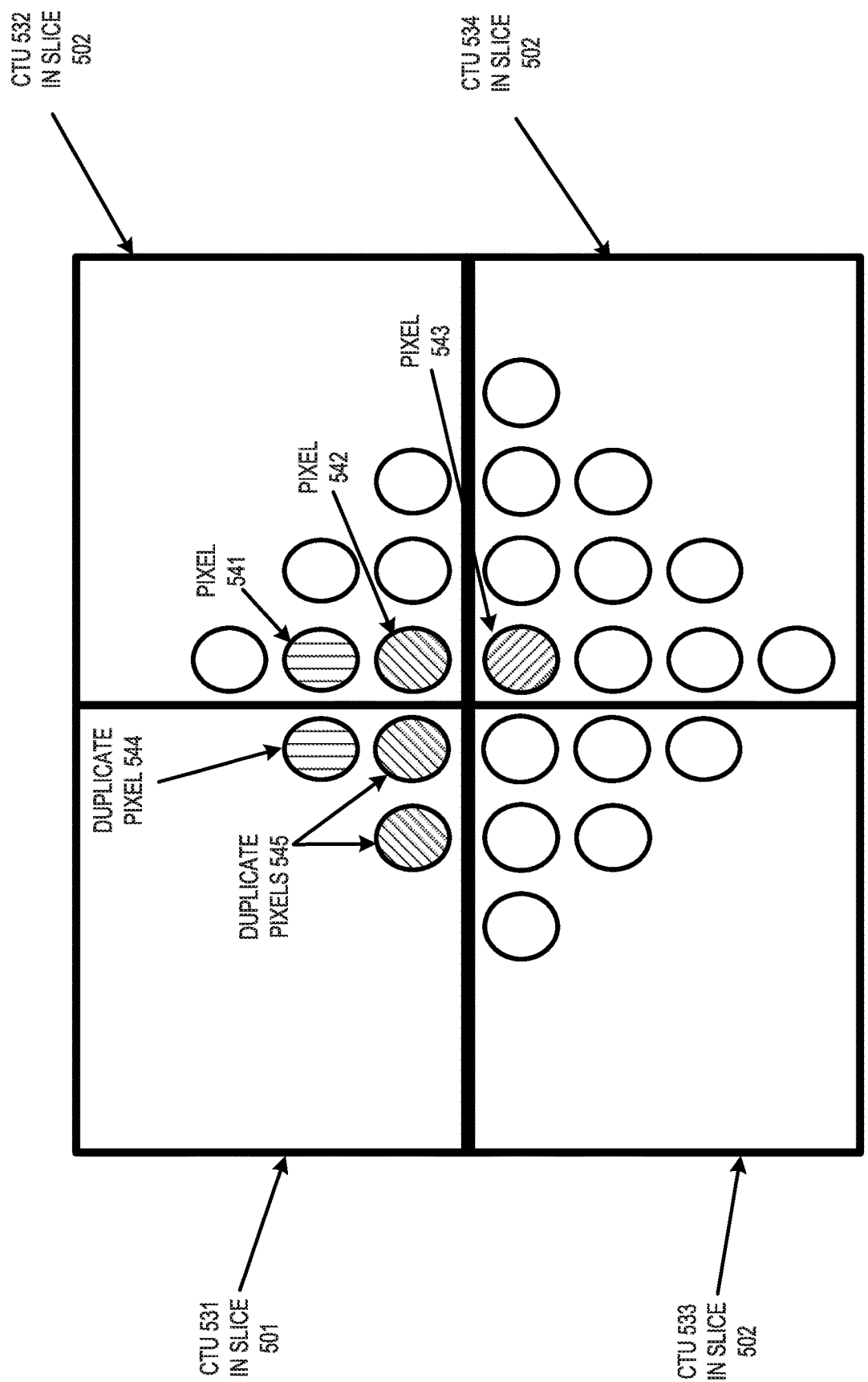
FIG. 5 is a conceptual diagram illustrating an example of a filter pattern for ALF filtering at a corner of a raster-scan slice, in accordance with some examples.

FIG. 5 is a diagram illustrating an example of an application of the nearest side-neighbor (e.g., left or right neighbor) to additional slice configurations. As shown in FIG. 5, the center pixel of the filter is pixel 543, and CTU 531 is in a separate slice 501 from CTU 532, CTU 533, and CTU 534, which are all in slice 502. In this case, when the conditions apply to make pixels in slice 501 unavailable for performing ALF using pixels in slice 502, the missing pixels in slice 501 are replaced (e.g., using pixels duplicated from available pixels) using the pixel from the closest right-side neighbor for each missing pixel. In this case, duplicate pixel 544 is generated from pixel 541, and duplicate pixels 545 are both generated by duplicating pixel 542. Where in aspects of FIG. 4, the first slice can be a raster scan slice with the second block located at a bottom-right corner of the first block, in FIG. 5 the first slice can be a raster scan slice with the second block located at a top-left corner of the first block. Additional examples which are not specifically shown can be implemented with the first slice as a raster scan slice, where the second block is located at either a bottom-left corner of the first block or a top-right corner of the first block.

FIG. 6 is a diagram illustrating another situation that can occur in a raster-scan configuration, with a corner point having a point where three different slices are present at a boundary. In the example of FIG. 6, CTU 631 is in a first slice 601, CTUs 632 and 633 are in a second slice 602, and CTU 634 is in a third slice 603. In this example, missing pixels for the ALF filter from CTU 631 are replaced with the closest right-neighbor CTU 632 pixels, and missing pixels for the ALF filter from CTU 634 are replaced with pixels from the closest left neighbor CTU 633 pixels. This duplication results in duplicate pixel 661 copied from pixel 641, duplicate pixels 662 copied from pixel 642, duplicate pixels 663 copied from pixel 643, duplicate pixels 664 copied from pixel 644, and duplicate pixel 665 copied from pixel 645. In this case, the lowest pixel in the filter pattern is duplicated from the closest left-neighbor CTU 633 pixel in the filter pattern. In other examples, the missing pixel can be duplicated from the closest neighbor pixel outside of the filter pattern, which would be the pixel below pixel 645 in the example of FIG. 6. In some such examples, a pixel which is not in a current row or column with the closest CTU pixel can be padded symmetrically or asymmetrically, or can be calculated with intra-prediction. Treating such pixels which are out of the column or row with the closest pixel from the neighbor CTU with available pixels differently allows for efficient calculations for close pixels in a shared row or column, but more complex calculations for pixels further away or with more complex positional relationships with the pixels to be duplicated, preventing excess degradation in the image quality due to the use of duplicated pixels.

In addition to the impact on ALF filter calculations described in FIGS. 4-6, a configuration blocking the use of pixel data from different slices can also impact other activity calculations, such as calculations for classifications as described above. These calculations to classify pixels or pixel sub-groups within a block can thus involve duplication of in-slice pixels to replace unavailable pixels due to disabling of the use of pixels from other slices. The classification can be used to select a loop filter, and the loop filter can then also use pixel duplication, as described above.

Figure 7:
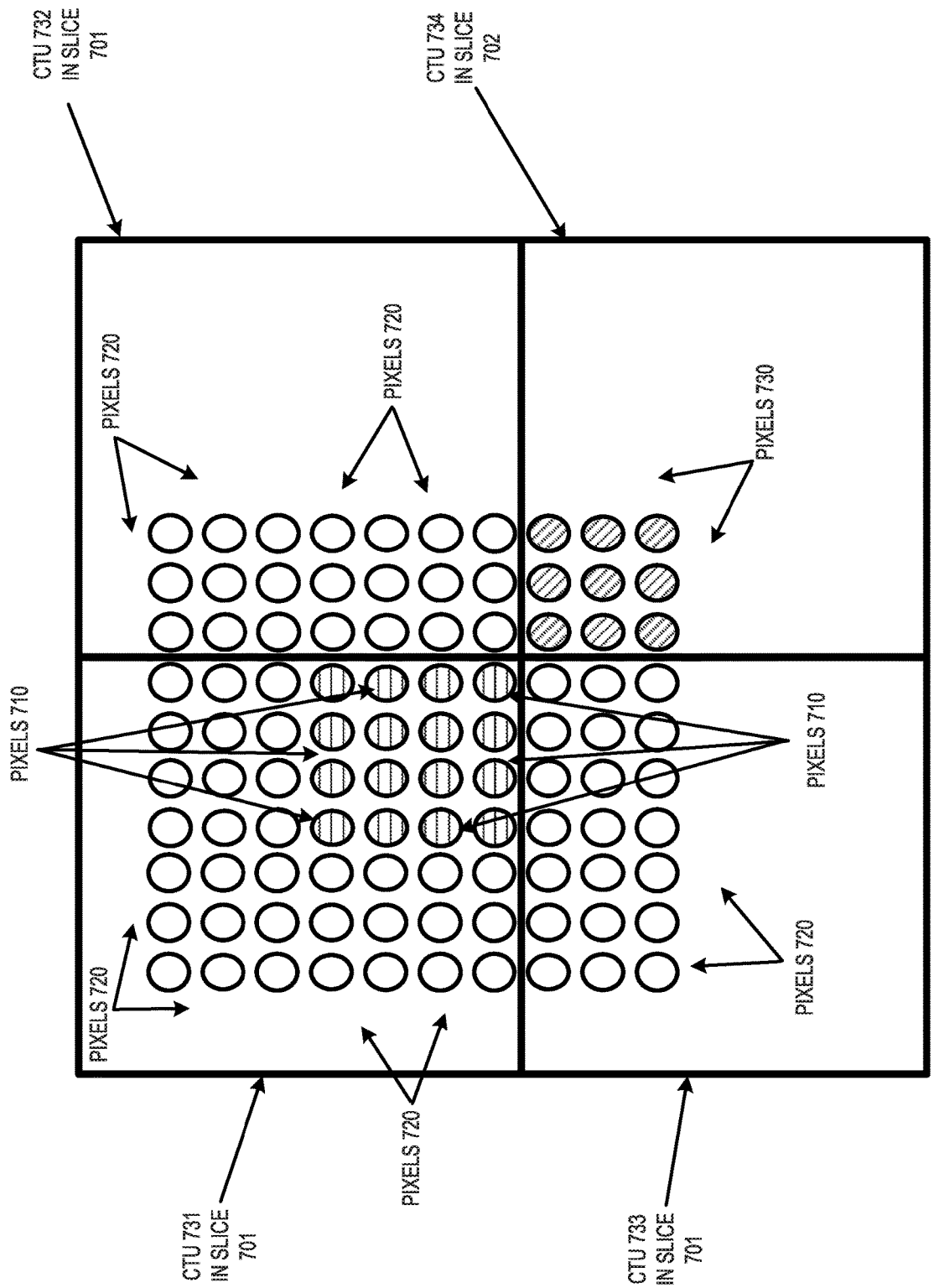
FIG. 7 is a conceptual diagram illustrating an example of a filter pattern for classification or activity filtering at a corner of a raster-scan slice, in accordance with some examples.

FIG. 7 is a diagram illustrating an example of a filter pattern for classification or activity filtering at a corner of a raster-scan slice. In FIG. 7, gradients are calculated for pixels 710 in a sub-block at a slice boundary between slice 701 and slice 702, with CTU 731, CTU 732, and CTU 733 in slice 701, and CTU 734 in slice 702. The gradient calculation for pixels 710 can use surrounding pixels 720. In this case, however, a prohibition against using pixels from across a slice boundary makes pixels 730 unavailable.

FIG. 7 shows a 7×7 filter pattern for pixels 710. Various techniques can be used to address the unavailability of pixels 730, corresponding to the example techniques described above for replacing missing values in an ALF filter. In a first example, unavailable pixels 730 are replaced with duplicates of the closest pixel in an above-neighboring CTU (CTU 732). In a second example, unavailable pixels are replaced with duplicates from a left-neighboring CTU (CTU 733). In a third example, unavailable pixels can be set equal to a linear combination of one pixel from the above CTU and one pixel from the adjacent left CTU as described above according to p=(wL*pL+wA*pA)/(wL+wA), where wL and wA are two weights, which may depend on the distance to the adjacent CTU and above CTU pixels, and where pL and pA are pixels from the adjacent CTU and the above CTU, respectively.

In another example, unavailable pixels can be set as equal to the closest pixel in the adjacent left CTU and the above CTU, or pixels not in a current CTU row (or other block row) may be padded symmetrically or asymmetrically. In a further example, pixels not in a current CTU column (or other block column) are be padded symmetrically or asymmetrically. In another example, seventh example, unavailable pixels are be derived by applying intra prediction.

In some examples, Laplacian values (activities) of missing pixels for classification are not calculated, but the activity value is rescaled. In one such example according to JVET-N1001, which is hereby incorporated by reference for all purposes, the activity value is rescaled as avgVar[x][y]=varTab[Clip3(0, 15, (sumOfHV[x>>2][y>>2]*68)>>(3+BitDepthY))] to address the unavailable pixels.

Figure 8:
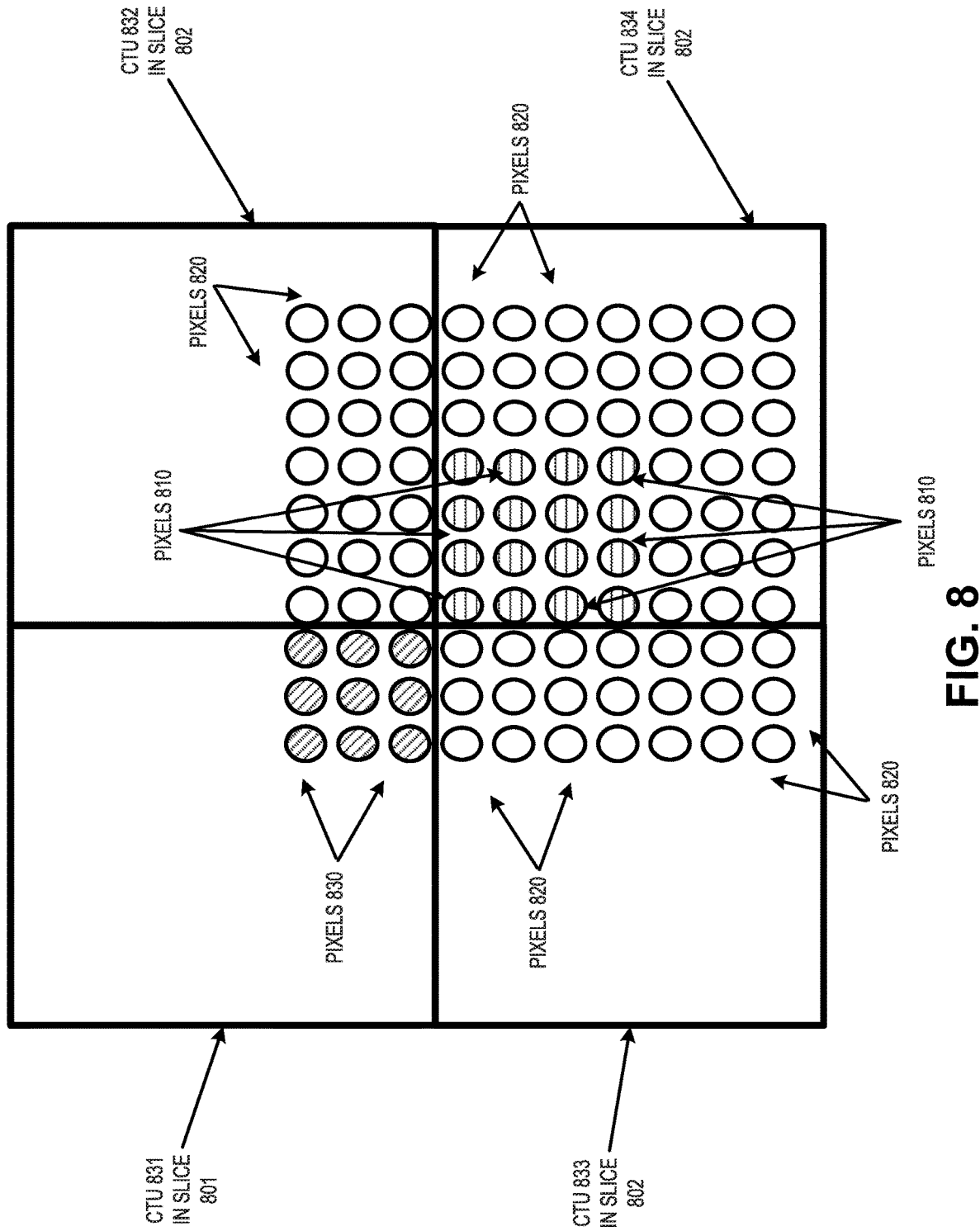
FIG. 8 is a conceptual diagram illustrating an example of a filter pattern for classification or activity filtering at a corner of a raster-scan slice, in accordance with some examples.

Similar to FIG. 7, FIG. 8 is a diagram illustrating an example of a filter pattern for classification or activity filtering at a corner of a raster-scan slice. In FIG. 8, gradients are calculated for pixels 810 in a sub-block, with CTU 831 in slice 801, and CTUs 832, 833, and 834 in slice 802. The gradient calculation for pixels 810 can use surrounding pixels 820. In this case, however, a prohibition against using pixels from across a slice boundary makes pixels 830 from slice 801 unavailable.

Figure 9:
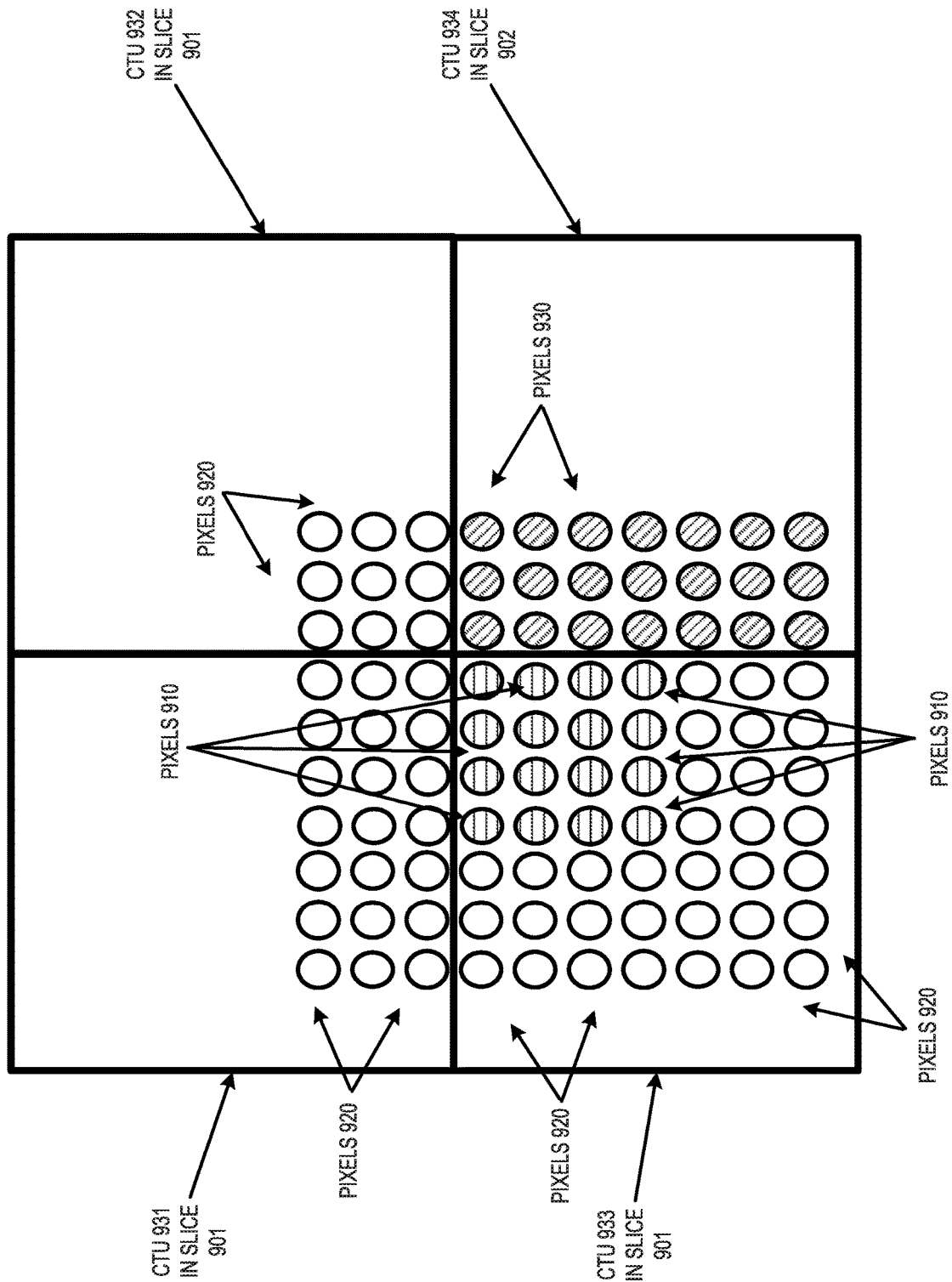
FIG. 9 is a conceptual diagram illustrating an example of a filter pattern for classification or activity filtering at a corner of a raster-scan slice, in accordance with some examples.

FIG. 9 is another diagram illustrating an example of a filter pattern for classification or activity filtering at a corner of a raster-scan slice. In FIG. 9, gradients are calculated for pixels 910 in a sub-block at a slice boundary between slice 901 and slice 902, with CTUs 931, 932, and 933 are in slice 901, and CTU 934 is in slice 902. The gradient calculation for pixels 910 can use surrounding pixels 920. In this case, as with other examples described herein, a prohibition against using pixels from across a slice boundary makes pixels 930 unavailable.

In FIGS. 4B-D and FIG. 7, the top and lower left CTUs are from a first slice, while the lower right CTU is from a second slice. FIGS. 4B-C shows a 7×7 filter pattern for a center pixel at a corner of a raster-scan slice (e.g., showing a ¼ case, which is when three out of four CTUs are from the same slice, and the fourth CTU is from a different slice), referred to as case 1. When a to-be-filtered pixel is in the first slice and needs pixels in the second slice to do filtering, the pixels in the second slice are unavailable when ALF is disabled across slice boundaries. Various techniques can be used to address such an issue. In a first example, unavailable pixels in the second slice may duplicate the closest pixel in a CTU above the CTU that includes the unavailable pixels (e.g., CTU 432 in FIGS. 4B-D). The above CTU can also be referred to as an above-neighboring CTU. In a second example, unavailable pixels in a second slice may duplicate the closest pixel in a left CTU (e.g., CTU 433 in FIGS. 4B-D) to the left of the CTU that includes the unavailable pixels (e.g., CTU 434 in FIG. 4B-D). The left CTU can also be referred to as a left-neighboring CTU.

In a third example, unavailable pixels in the second slice may be equal to a linear combination of one pixel from the above CTU and one pixel from the left CTU as p=(wL*pL+wA*pA)/(wL+wA), where wL and wA are two weights, which may depend on the distance to left CTU and above CTU, and where pL and pA are pixels from the left CTU and the above CTU, respectively.

In a fourth example, unavailable pixels in the second slice may be equal to the closest pixel in the left CTU and the above CTU. In a fifth example, pixels not in a current CTU row (or other block row) may be padded symmetrically or asymmetrically. In a sixth example, pixels not in a current CTU column (or other block column) may be padded symmetrically or asymmetrically. In a seventh example, unavailable pixels in the second slice may be derived by applying intra prediction.

In some cases, an activity calculation can be made for a sub-block at a corner of a raster-scan slice (e.g., showing a ¼ case, which is when three out of four CTUs are from the same slice, and the fourth CTU is from a different slice). For example, FIG. 7 shows the pixel usage and where gradients are calculated for the current sub-block (e.g., pixels 710). To solve the unavailability of the pixels, one or any combination of the following may be performed: one or any combination of the pixel padding techniques described above may be applied to the pixels in the second slice (e.g., the top three pixels in the second slice, or all six pixels in the second slice); gradient values in the second slice may be padded by applying one or any combination of the padding techniques described above to available gradient values; [0001] gradient values in the second slice may not be calculated and an activity value in JVET-N1001 and can be rescaled as:

$$\mathrm{avgVar}[x][y]=\mathrm{varTab}[\mathrm{Clip3}(0,15,(\mathrm{sumOfHV}[x>>2][y>>2]*68)>>(3+\mathrm{BitDepthy}))](8\text{-}1243).$$

In another example, FIG. 9 shows the pixel usage and where gradients are calculated for the current sub-block (e.g., including the top-right-most 4×4 pixels in CTU 932 of slice 901, but excluding the unavailable pixels of CTU 934 in slice 902). To solve the unavailability of the pixels, one or any combination of the following may be performed: one or any combination of pixel padding techniques described above may be applied to the pixels in the second slice (e.g., all pixels in CTU 934 shown in FIG. 9); gradient values in slice 902 may be padded by applying one or any combination of the padding method above to available gradient values; gradient values in CTU 934 of slice 802 may not be calculated and an activity value in JVET-N1001 can be rescaled as:

$$\mathrm{avgVar}[x][y]=\mathrm{varTab}[\mathrm{Clip3}(0,15,(\mathrm{sumOfHV}[x>>2][y>>2]*79)>>(3+\mathrm{BitDepthy}))](8\text{-}1243)$$

FIG. 9 also illustrates an example of a filter pattern for classification or activity filtering at a corner of a raster-scan slice. For example, in FIG. 9, gradients are calculated for pixels 910 in a sub-block at a slice boundary between slice 901 and slice 902, with CTUs 931, 932, and 933 are in slice 901, and CTU 934 is in slice 902. The gradient calculation for pixels 910 can use surrounding pixels 920. In this case, as with other examples described herein, a prohibition against using pixels from across a slice boundary makes pixels 930 unavailable.

Figure 10:
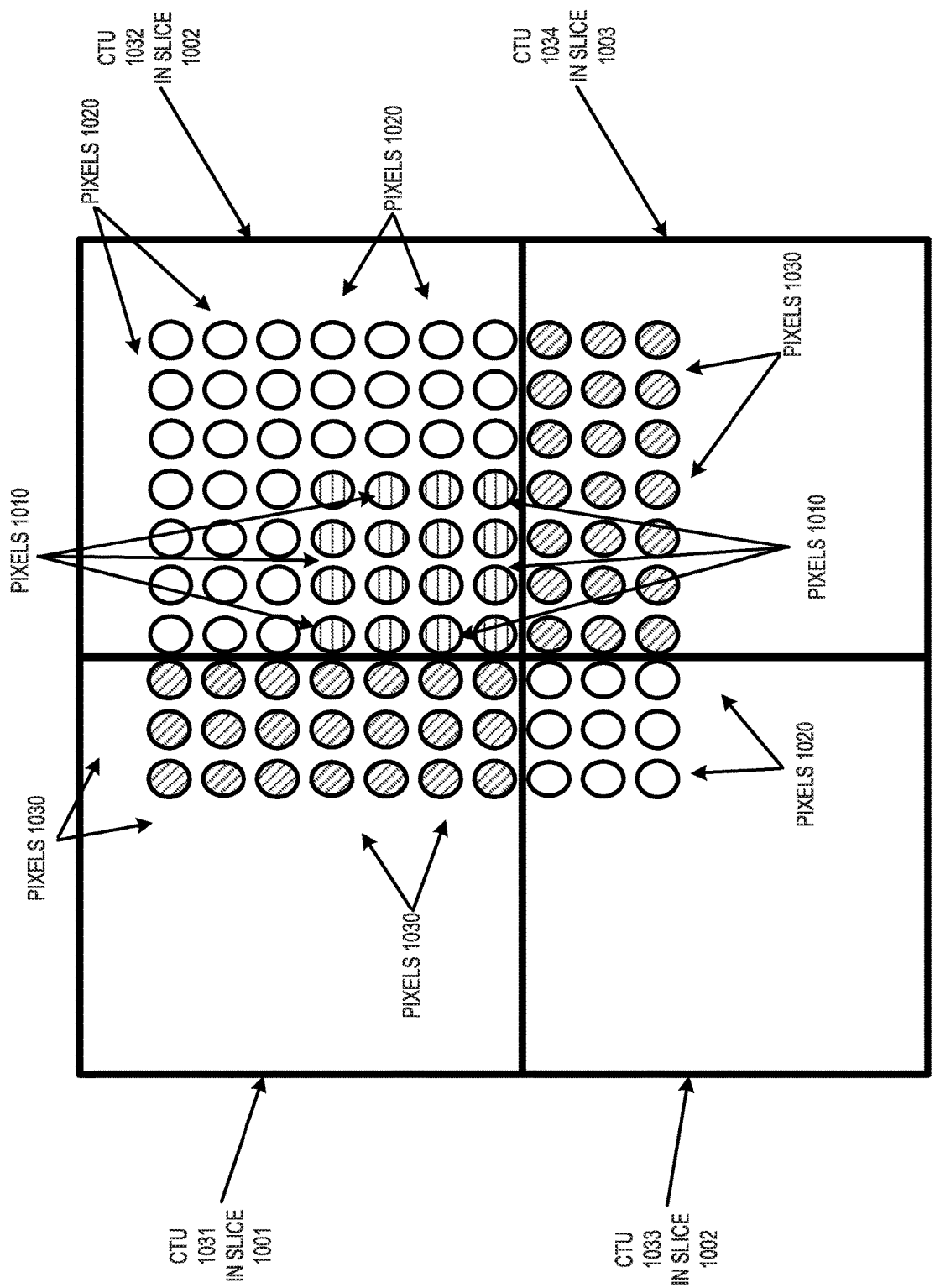
FIG. 10 is a conceptual diagram illustrating an example of a filter pattern for classification or activity filtering at a corner boundary between three slices, in accordance with some examples.

FIG. 10 is a diagram illustrating an example of a filter pattern for classification or activity filtering at a corner where three slices 1001, 1002, and 1003 meet. In FIG. 10, gradients are calculated for pixels 1010 in a sub-block at slice boundaries around slice 1003, slice, 1001 and slice

1002, with CTU 1031 in slice 1001; CTU 1032 and CTU 1033 in slice 1002; and CTU 1034 in slice 1003. The gradient calculation for pixels 1010 in slice 1002 can use surrounding pixels 1020, but cannot use unavailable pixels 1030 from slice 1001 and 1003 because a prohibition against using pixels from across a slice boundary makes pixels 1030 unavailable.

In FIG. 5, FIG. 8 and FIG. 9, CTUs from a first slice are in a separate slice from pixels being analyzed from a second slice. For example, FIG. 5 shows a 7×7 filter pattern for a pixel at a corner of a raster-scan slice (e.g., showing a ¼ case, which is when the first CTU is from the first slice and the other three CTUs are from the second slice). When a to-be-filtered pixel is in the second and needs pixels in the first slice to do filtering, the pixels in the first slice are unavailable when ALF is disabled across slice boundaries. Various techniques can be used to address such an issue. In a first example, unavailable pixels in the first slice may duplicate the closest pixel in a right CTU to the right of the CTU that includes the unavailable pixels. The right CTU can also be referred to as a right-neighboring CTU. In a second example, unavailable pixels may duplicate the closest pixel in a below CTU below the CTU that includes the unavailable pixels. The below CTU can also be referred to as a below-neighboring CTU.

In a third example, unavailable pixels in the first slice may be equal to a linear combination of one pixel from the right CTU and one pixel from the below CTU as p=(wR*pR+wD*pD)/(wR+wD), where wR and wD are two weights, which may depend on the distance to right CTU and the below CTU, respectively.

In a fourth example, unavailable pixels in a first slice may be equal to the closest pixel in the right CTU and the below CTU, or unavailable pixels in the first slice may be equal to the closest pixel in the left CTU and the above CTU. In a fifth example, pixels not in a current CTU row (or other block row) may be padded symmetrically or asymmetrically. In a sixth example, pixels not in a current CTU column (or other block column) may be padded symmetrically or asymmetrically. In a seventh example, unavailable pixels in the first slice may be derived by applying intra prediction.

FIG. 9 can further be used to illustrate a group of CTUs where an activity calculation can be made for a sub-block at a corner of a raster-scan slice (e.g., showing a ¼ case, which is when three out of four CTUs are from the same slice, and the fourth CTU is from a different slice). FIG. 9 further shows the pixel usage and where gradients are calculated for the current sub-block (shown in red color, including the top-left-most 4×4 pixels in the second slice). To solve the unavailability of the pixels, one or any combination of the following may be performed: one or any combination of the pixel padding techniques described above may be applied to the pixels in the first slice; gradient values in the first slice may be padded by applying one or any combination of the pixel padding techniques described above to available gradient values; gradient values in the first slice may not be calculated and an activity value in JVET-N1001 can be rescaled as:

$$\text{avgVar}[x][y]=\text{varTab}[\text{Clip3}(0,15,(\text{sumOfHV}[x>>2][y>>2]*68)>>(3+\text{BitDepthy}))](8\text{-}1243)$$

Returning to FIG. 8, an activity calculation can be made for a sub-block at a corner of a raster-scan slice (e.g., showing a ¼ case, which is when the first CTU is from the first slice and the other three CTUs are from the second slice). FIG. 8 shows the pixel usage and where gradients are calculated for the current sub-block. To solve the unavailability of the pixels, one or any combination of the following may be performed: [0002] one or any combination of the pixel padding techniques described above may be applied to the pixels in the first slice (e.g., all pixels in CTU 831 shown in FIG. 8); [0003] gradient values in the first slice may be padded by applying one or any combination of the pixel padding techniques described above to available gradient values; gradient values in the first slice may not be calculated and an activity value in JVET-N1001 can be rescaled as:

$$\text{avgVar}[x][y]=\text{varTab}[\text{Clip3}(0,15,(\text{sumOfHV}[x>>2][y>>2]*79)>>(3+\text{BitDepthy}))](8\text{-}1243).$$

In FIG. 6 and FIG. 10, two diagonal CTUs are from a shared slice, while the other CTUs are in different slices. When a to-be-filtered pixel is in one of the two CTUs that share a slice and need pixels from another to do filtering, some are unavailable when ALF is disabled across slice boundaries. Various techniques can be used to address such an issue. In a first example, unavailable pixels in may duplicate the closest pixel in a right CTU to the right of the CTU that includes the unavailable pixels. The right CTU can also be referred to as a right-neighboring CTU. In a second example, unavailable pixels may duplicate the closest pixel in a below CTU below the CTU that includes the unavailable pixels. The below CTU can also be referred to as a below-neighboring CTU.

In a third example, unavailable pixels may be equal to a linear combination of one pixel from the right CTU and one pixel from the below CTU as p=(wR*pR+wD*pD)/(wR+wD), where wR and wD are two weights, which may depend on the distance to right CTU and the below CTU, respectively.

In a fourth example, unavailable pixels may be equal to the closest pixel in the right CTU and the below CTU. In a fifth example, pixels not in a current CTU row (or other block row) may be padded symmetrically or asymmetrically. In a sixth example, pixels not in a current CTU column (or other block column) may be padded symmetrically or asymmetrically. In a seventh example, unavailable pixels may be calculated by applying intra prediction.

In an eight example, unavailable pixels may duplicate the closest pixel in an upper CTU. In a ninth example, unavailable pixels may duplicate the closest pixel in a left CTU.

In a tenth example, unavailable pixels may be equal to a linear combination of one pixel from the upper CTU and one pixel from the left CTU as p=(wL*pL+wU*pU)/(wL+wU), where wL and wU are two weights, which may depend on the distance to the left CTU and the upper CTU, respectively.

In an eleventh example, unavailable pixels may be equal to the closest pixel in left CTU and the above CTU. In a twelfth example, pixels not in a current CTU row (or other block row) may be padded symmetrically or asymmetrically. In a thirteenth example, pixels not in a current CTU column (or other block column) may be padded symmetrically or asymmetrically. In a fourteenth example, unavailable pixels may be calculated by applying intra prediction.

FIG. 10 can also be used as an example illustrating a group of CTUs where an activity calculation can be made for a sub-block at a slice corner. FIG. 10 shows the pixel usage and where gradients are calculated for the current sub-block. To solve the unavailability of the pixels, one or any combination of the following may be performed: one or any combination of the pixel padding techniques described above may be applied to the unavailable pixels;

unavailable gradient values may be padded by applying one or any combination of the pixel padding techniques described above to available gradient values; gradient values may not be calculated and an activity value in JVET-N1001 can be rescaled as:

avgVar[x][y]=varTab[Clip3(0,15,(sumOfHV[x>>2][y>>2]*92)>>(3+BitDepthy))](8-1243).

Figure 11:
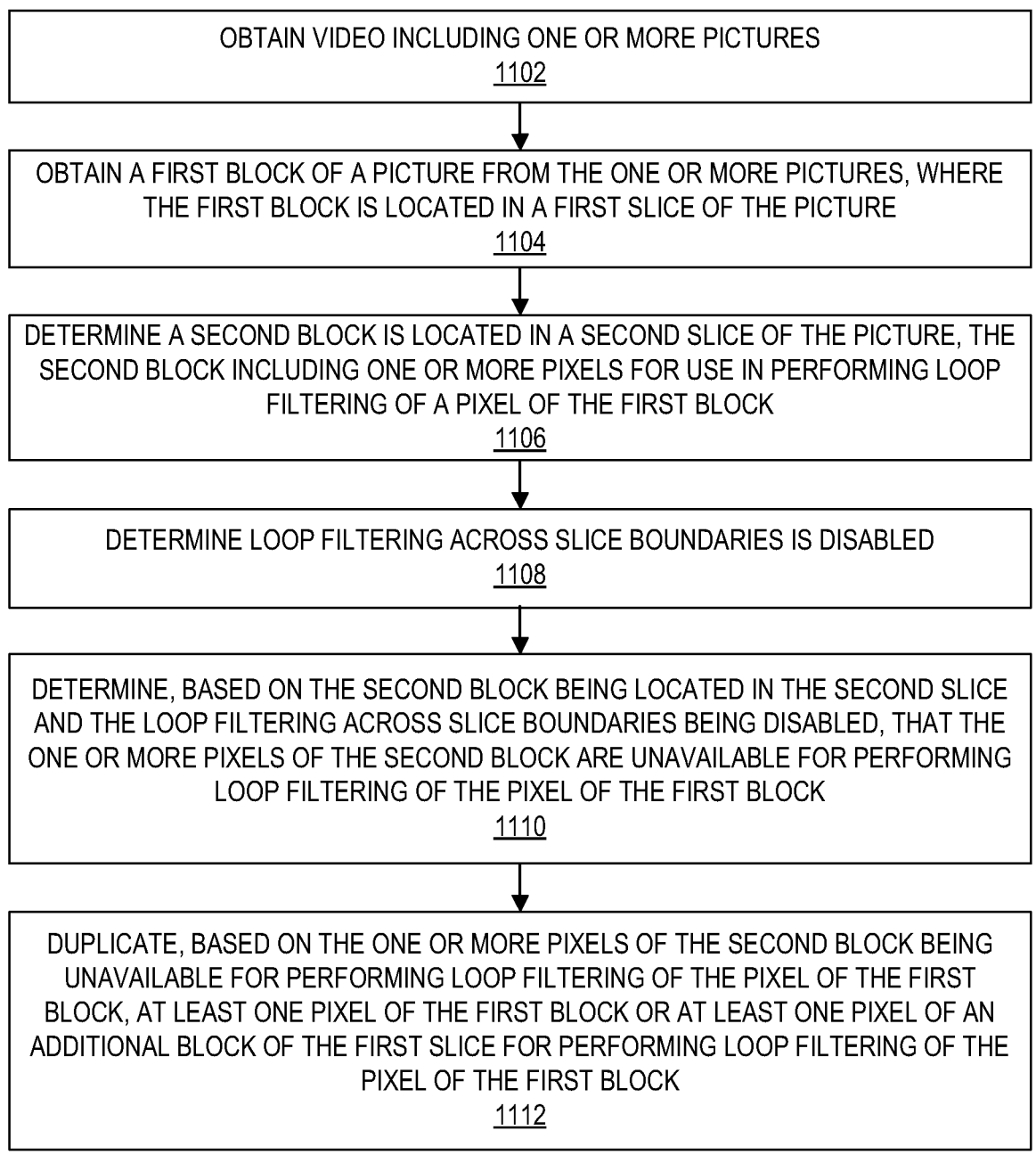
FIG. 11 is a flowchart illustrating an example method for processing video data, in accordance with some examples of the present disclosure.

Having disclosed example systems, components and concepts, the disclosure now turns to the example method 1100 for processing video data, as shown in FIG. 11. In some examples, the processing of video data by method 1100 can include different or varying combinations of operations for replacing (e.g., using duplicated available pixels) unavailable pixels for ALF filtering or classification when some pixels are unavailable due to limits on cross-slice pixel data (e.g., in raster-scan configurations). In various implementations, method 1100 can be performed by encoding or decoding devices as part of a video processing system. In some examples, method 1100 can be implemented as instructions in a non-transitory storage medium that, when executed by processing circuitry, causes a device to perform method 1100. The steps outlined herein are non-limiting examples provided for illustration purposes, and can be implemented in any combination thereof, including combinations that exclude, add, or modify certain steps.

At block 1102, the method 1100 can include obtaining video data including one or more pictures. In some examples, an encoding device (e.g., encoding device 94) can receive the one or more pictures from a video source (e.g., video source 92), such as a camera. In some examples, a decoding device (e.g., decoding device 102) can receive, from an encoding device (e.g., encoding device 94), an encoded video bitstream including the one or more pictures. In some examples, the encoded video bitstream can include signaling information. The signaling information can include, for example and without limitation, a flag indicating that ALF is enabled. This signaling information can also include a flag or other information indicating that from across slice boundaries are unavailable (e.g., for ALF or classification in a raster-scanned slice). Such a flag or other information indicating that loop filtering is disabled across slice boundaries can include a clipping flag related to CTU positions and slices. Such a clipping flag can be set based on various different configurations in a system, which can create a configuration where data from different slices are unavailable for loop filtering operations in a current slice.

At block 1104, the method 1100 can include obtaining a first block of a picture from the one or more pictures, where the first block is in a first slice of the picture. In some examples, an encoding device (e.g., encoding device 94) can partition the video data into one or more slices containing blocks. In some examples, the block can be an encoded block in an encoded video bitstream, and a decoding device (e.g., decoding device 112) can decode the block of the picture using signaling information in the bitstream by applying a coding algorithm and/or standard that matches the coding algorithm and/or standard used to encode the block, the slice, the picture and/or the bitstream. In some examples, the decoding device can reconstruct the block of the picture as described with respect to system 90 shown in FIG. 1 and decoding device 112 shown in FIG. 13.

At block 1106, the method 1100 can include determining a second block is located in a second slice of the picture, with the second block including one or more pixels for use in performing loop filtering of a pixel in the first block. In some examples, the second block and the first block are each CTUs, with the first block being a first CTU and the second block being a second CTU. Just as above, in some examples, an encoding device (e.g., encoding device 94) can partition the video data into one or more slices containing including the first slice and the second slice, along with blocks including the pixels. In some examples, the second slice can include an encoded blocks in an encoded video bitstream, and a decoding device (e.g., decoding device 112) can decode the blocks and slices of the picture using signaling information in the bitstream by applying a coding algorithm and/or standard that matches the coding algorithm and/or standard used to encode the block, the slice, the picture and/or the bitstream. In some examples, this encoding and decoding involves raster-scan partitioning of the picture. In some examples, the decoding device can partition and reconstruct the blocks and slices of the picture in the raster-scan configuration, such as that described in FIGS. 4A-D, above using system 90 shown in FIG. 1 and decoding device 112 shown in FIG. 13.

At block 1108, the method 1100 can include determining that loop filtering across slice boundaries is disabled. As described above, this can be performed as part of encoding operations by processing the encoding data to determine that loop filtering across slice boundaries is disabled, or by decoding an encoded bitstream using a decoding device to identify a flag or other information identifying that data from pixels across slice boundaries is unavailable for processing pixels in a current slice.

At block 1110, the method 1100 can include determining that the one or more pixels of the second block are unavailable for performing loop filtering of the pixel of the first block based on the second block being located in the second slice and the pixel being processed being in the first slice. In some examples, the loop filter for loop filtering is an adaptive loop filter. In some examples, the loop filter is a linear or non-linear filter with sample classification based on gradients.

At block 1112, the method 1100 can the include duplicating at least one pixel of the first block or at least one pixel of an additional block of the first slice to be used for performing loop filtering of the pixel of the first block. This duplication is done based on the one or more pixels of the second block being unavailable due to the disabling of loop filtering across slice boundaries. In some cases, the at least one pixel of the first block or the at least one pixel of the additional block of the first slice includes one or more pixels of a slice closest to the second block.

In some examples, the relative position of the slices and block can determine how the duplication occurs at block 1112. In one example, the first slice is a raster scan slice and the second block is located at a bottom-right corner of the first block. In another example, the second block is located at a top-left corner of the first block. In still further examples, the second block is located at a top-right corner of the first block or a bottom-left corner of the first block. In one example, the first slice is a raster scan slice and the second block (in a different slice from the first block) is located at a bottom-right corner of the first block. In such an example, the at least one pixel of the first block or the at least one pixel of the additional block of the first slice comprise one or more pixels of a left-neighboring block (in the same slice of the first block) of the second block closest to the second block. In another such example, the at least one pixel of the first block or the at least one pixel of the additional block of the first slice comprise one or more pixels of a top-neighboring block (in the same slice of the first block) of the second block closest to the second block. In another such example, the at least one pixel of the first block or the at least one pixel of the additional block of the first slice comprise one or more pixels of a left-neighboring block (in the same slice of the first block) of the second block closest to the second block and one or more pixels of a top-neighboring block (in the same slice of the first block) of the second block closest to the second block.

In some such examples, the duplication can be efficiently implemented by duplicating a closest pixels in a shared row or column to a pixel being replaced due to unavailability. In such implementations, if a closest pixel in a shared row is being duplicated, a pixel at coordinate (closest x position, y) can be duplicated to replace an unavailable pixel at coordinate (x,y). Similar, if a closest pixel in a shared column is being duplicated, a pixel at coordinate (x, closest y position) can replace an unavailable pixel at coordinate (x,y).

In other examples, other duplication operations can be used, or combinations of duplication operations can be used.

In some cases, applying the at least one filter to the block can include applying a 5×5 adaptive loop filter to the chroma component and applying a 7×7 adaptive loop filter to the luma component. In some examples, the 5×5 adaptive loop filter and the 7×7 adaptive loop filter can have a diamond shape. In other examples, the applied filter or filters can include one or more other filter sizes and/or shapes.

In some examples, a decoding device (e.g., decoding device 112) can obtain an encoded video bitstream including the one or more pictures and decode the block of the picture from the encoded video bitstream. In some examples, the decoding device can identify signaling information associated with the encoded video bitstream, and use the signaling information to reconstruct the block with associated limitations on ALF filtering and limitations on cross slice data usage, determine one or more coefficients for the at least one filter, determine a filter size and/or shape, determine whether filtering is enabled, and/or apply the at least one filter to the reconstructed block. In some examples, the signaling information can include signals for the use of pixels across slice boundaries, filter parameters (e.g., filter coefficients, filter size parameters, filter shape parameters, etc.), and/or an adaptive loop filter flag (e.g., an ALF flag indicating whether luma and/or chroma ALF filtering is enabled).

In some examples, the method 1100 can include generating an encoded video bitstream (e.g., via an encoding device 104) including the one or more pictures and sending the encoded video bitstream to a decoding device (e.g., decoding device 112). In some cases, the encoded video bitstream can be sent with signaling information. The signaling information can include, for example, the offset value, filter parameters (e.g., filter coefficients, filter size parameters, filter shape parameters, etc.), and/or an adaptive loop filter flag (e.g., an ALF flag indicating whether luma and/or chroma ALF filtering is enabled).

In some examples, the method 1100 can include storing the encoded video bitstream. In some examples, the method 1100 can include presenting the reconstructed video from the encoded video bitstream after reconstructing blocks of pictures in the encoded video bitstream and applying one or more ALF filters with duplicated pixels as described in various examples to one or more of the blocks of the pictures in the encoded video.

In some implementations, the processes (or methods) described herein can be performed by a computing device or an apparatus, such as the system 100 shown in FIG. 1. For example, the processes can be performed by the encoding device 104 shown in FIG. 1 and FIG. 12, by another video source-side device or video transmission device, by the decoding device 112 shown in FIG. 1 and FIG. 13, and/or by another client-side device, such as a player device, a display, or any other client-side device. In some cases, the computing device or apparatus may include a processor, microprocessor, microcomputer, or other component of a device that is configured to carry out the steps of the processes described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may further include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The components of the computing device or apparatus can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes can be described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i. e. laptop) computers, tablet computers, set-top boxes, telephone handsets such as so-called "smart" phones, so-called "smart" pads, televisions, cameras, display devices, digital media players, video gaming consoles, video streaming devices, mobile devices, Internet-of-Things (IoT) devices, HMDs, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 12:
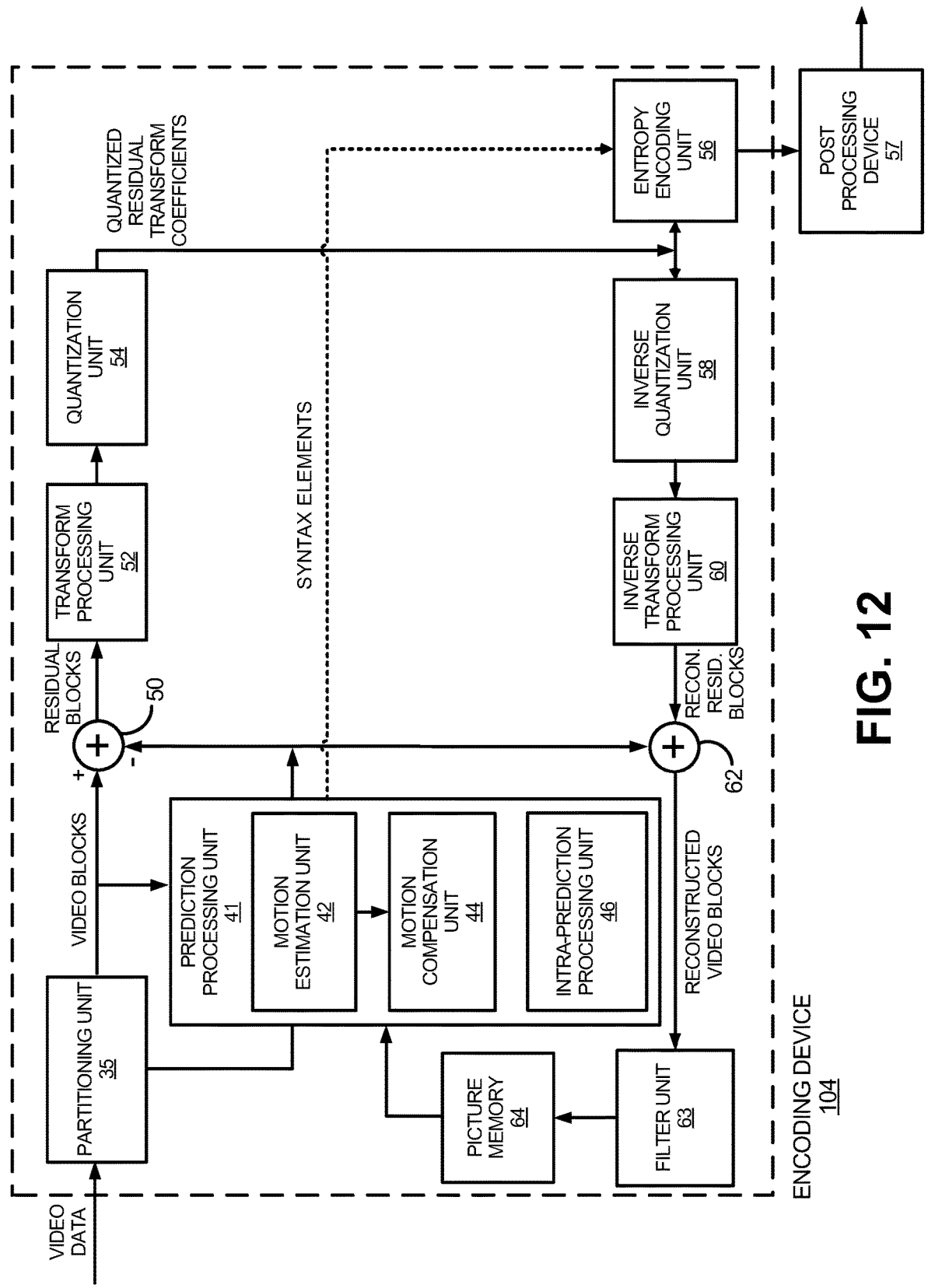
FIG. 12 is a block diagram illustrating an example video encoding device, in accordance with some examples of the present disclosure.
Figure 13:
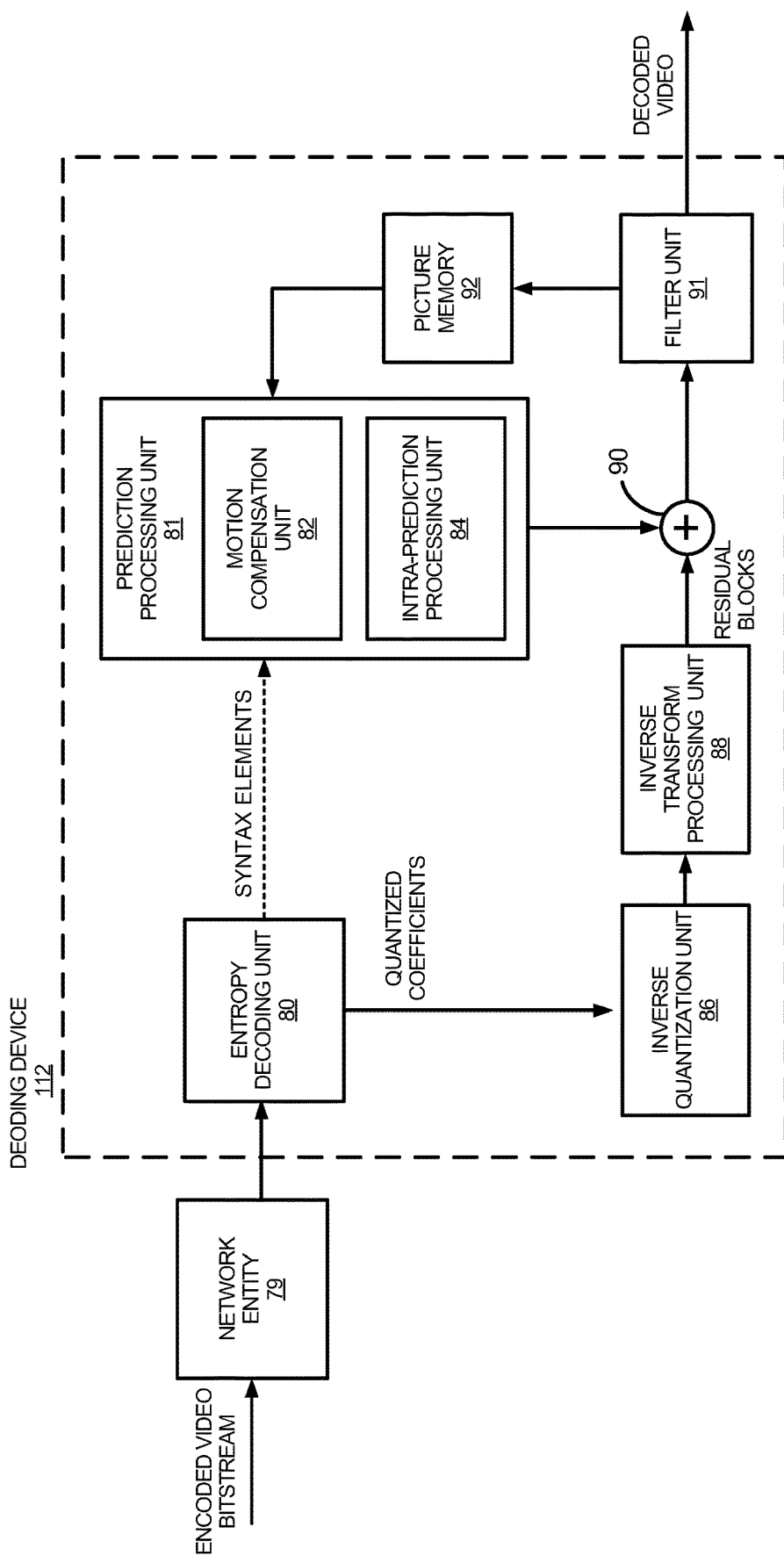
FIG. 13 is a block diagram illustrating an example video decoding device, in accordance with some examples of the present disclosure.

Specific details of the encoding device 104 and the decoding device 112 are shown in FIG. 12 and FIG. 13, respectively. FIG. 12 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 12 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 12, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In some examples, the encoding device 104 of FIG. 12 can represent an example of a video encoder configured to calculate ALF filter with pixel duplication, performing ALF filtering with clipping, derive various coding parameters, etc. The encoding device 104 may, for example, calculate ALF filter and clipping values and/or perform ALF filtering with pixel duplication as described above. For instance, the encoding device 104 may perform any of the techniques described herein, including the processes and techniques described above with respect to FIGS. 2A through 6. In some cases, some of the techniques of this disclosure may also be implemented by post processing device 57.

FIG. 13 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 12.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i. e. B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and/or a sample adaptive offset (SAO) filter. Although filter unit 91 is shown in FIG. 13 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In some examples, the decoding device 112 of FIG. 13 represents an example of a video decoder configured to calculate ALF filter and pixel duplication values, perform ALF filtering with pixel duplication, derive various coding parameters, etc. The decoding device 112 may, for example, calculate ALF filter and clipping values and perform ALF filtering with pixel duplication as described above. For instance, the decoding device 112 may perform any of the techniques described herein, including the processes and techniques described above with respect to FIGS. 2A through 8.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended examples are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the example. For example, example language reciting "at least one of A and B" means A, B, or A and B. In another example, example language reciting "at least one of A, B, and C" means A, B, C, or A and B, or A and C, or B and C, or A and B and C. The language "at least one of" a set and/or "one or more" of a set does not limit the set to the items listed in the set. For example, example language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Example 1. A method of processing video data, the method comprising: obtaining at least one pixel to be filtered using a loop filter, the at least one pixel being located in a first sub-portion of a picture; determining one or more pixels located in a second sub-portion of the picture are needed to filter the at least one pixel using the loop filter; and duplicating, for padding the one or more pixels located in the second sub-portion, one or more closest pixels in at least one of an above-neighboring sub-portion, a left-neighboring sub-portion, a right-neighboring sub-portion, and a below-neighboring sub-portion.

Example 2. The method of example 1, where the loop filter is an adaptive loop filter (ALF).

Example 3. The method any one of examples 1 to 2, where the first sub-portion is a first slice of the picture, and where the second sub-portion is a second slice of the picture.

Example 4. The method of any one of examples 1 to 3, where the first sub-portion of the picture is an L-shape (also referred to as a raster-scanned slice).

Example 5. The method any one of examples 1 to 4, where duplicating the one or more closest pixels includes determining a linear combination of at least one pixel from a first one of the above-neighboring sub-portion, the left-neighboring sub-portion, the right-neighboring sub-portion, and the below-neighboring sub-portion and at least one pixel from a second one of the above-neighboring sub-portion, the left-neighboring sub-portion, the right-neighboring sub-portion, and the below-neighboring sub-portion.

Example 6. The method any one of examples 1 to 4, where the one or more pixels located in the second sub-portion are determined to be equal to a closest pixel in a first one of the above-neighboring sub-portion, the left-neighboring sub-portion, the right-neighboring sub-portion, and the below-neighboring sub-portion and a second one of the above-neighboring sub-portion, the left-neighboring sub-portion, the right-neighboring sub-portion, and the below-neighboring sub-portion.

Example 7. The method any one of examples 1 to 4, where at least one pixel of the one or more pixels located in the second sub-portion that is not in a current block row is padded symmetrically or asymmetrically.

Example 8. The method any one of examples 1 to 4, where at least one pixel of the one or more pixels located in the second sub-portion that is not in a current block column is padded symmetrically or asymmetrically.

Example 9. The method any one of examples 1 to 4, where the one or more pixels located in the second sub-portion are derived by applying intra prediction.

Example 10. An apparatus comprising a memory configured to store video data and a processor configured to process the video data according to any of examples 1 to 9.

Example 11. The apparatus of example 10, where the apparatus includes an encoder.

Example 12. The apparatus of example 10, where the apparatus includes a decoder.

Example 13. The apparatus of any one of examples 10 to 12, where the apparatus is a mobile device.

Example 14. The apparatus of any one of examples 10 to 13, further comprising a display configured to display the video data.

Example 15. The apparatus of any one of examples 10 to 14, further comprising a camera configured to capture one or more pictures.

Example 16. A computer readable medium having stored thereon instructions that when executed by a processor perform the methods of any of examples 1 to 9.

Example 17. A method of processing video data, the method comprising: obtaining video data comprising one or more pictures; obtaining a first block of a picture from the one or more pictures, the first block being located in a first slice of the picture; determining a second block is located in a second slice of the picture, the second block including one or more pixels for use in performing loop filtering of a pixel of the first block; determining loop filtering across slice boundaries is disabled; determining, based on the second block being located in the second slice and the loop filtering across slice boundaries being disabled, that the one or more pixels of the second block are unavailable for performing loop filtering of the pixel of the first block; and duplicating, based on the one or more pixels of the second block being unavailable for performing loop filtering of the pixel of the first block, at least one pixel of the first block or at least one pixel of an additional block of the first slice for performing loop filtering of the pixel of the first block.

Example 18. The method of example 17, where the loop filter is an adaptive loop filter (ALF).

Example 19. The method of example 17, where the at least one pixel of the first block or the at least one pixel of the additional block of the first slice comprise one or more pixels of a slice closest to the second block.

Example 20. The method of example 17, where the first slice is L-shaped and the second block is located at a bottom-right corner of the first block.

Example 21. The method of example 20, where the at least one pixel of the first block or the at least one pixel of the additional block of the first slice comprise one or more pixels of a left-neighboring block (in the first slice) of the second block closest to the second block.

Example 22. The method of example 20, where the at least one pixel of the first block or the at least one pixel of the additional block of the first slice comprise one or more pixels of a top-neighboring block (in the first slice) of the second block closest to the second block.

Example 23. The method of example 20, where the at least one pixel of the first block or the at least one pixel of the additional block of the first slice comprise one or more pixels of a left-neighboring block (in the first slice) of the second block closest to the second block and one or more pixels of a top-neighboring block (in the first slice) of the second block closest to the second block.

Example 24. The method of example 20, where the first block comprises a first coding tree unit (CTU) and the second block comprises a second CTU.

Example 25. The method of example 20, where the first slice and the second slice are obtained from raster scan partitioning of the picture.

Example 26. The method of example 20, further comprising: generating an encoded video bitstream comprising the one or more pictures.

Example 27. The method of example 26, where the encoded video bitstream is generated based on the video data and a result of applying the at least one filter to the block.

Example 28. The method of example 26, further comprising: sending the encoded video bitstream to a decoding device, the encoded video bitstream being sent with signaling information, the signaling information comprising at least a clip flag (e.g., associated with disabling of loop filtering using data from other slices) and an adaptive loop filter flag.

Example 29. The method of example 26, further comprising: storing the encoded video bitstream.

Example 30. The method of example 20, further comprising: obtaining an encoded video bitstream comprising the one or more pictures; identifying signaling information associated with the encoded video bitstream, the signaling information comprising at least an adaptive loop filter flag and an indication that the loop filtering across slice boundaries is disabled; and decoding the block of the picture from the encoded video bitstream.

Example 31. The method of example 30, where decoding the block of the picture from the encoded video bitstream comprises reconstructing the block of the picture, and further comprising applying at least one filter to the reconstructed block.

Example 32. An apparatus comprising: memory; and one or more processors coupled to the memory, the one or more processors being configured to: obtain video data comprising one or more pictures; obtain a first block of a picture from the one or more pictures, the first block being located in a first slice of the picture; determine a second block is located in a second slice of the picture, the second block including one or more pixels for use in performing loop filtering of a pixel of the first block; determine loop filtering across slice boundaries is disabled; determine, based on the second block being located in the second slice and the loop filtering across slice boundaries being disabled, that the one or more pixels of the second block are unavailable for performing loop filtering of the pixel of the first block; and duplicate, based on the one or more pixels of the second block being unavailable for performing loop filtering of the pixel of the first block, at least one pixel of the first block or at least one pixel of an additional block of the first slice for performing loop filtering of the pixel of the first block.

Example 33. The apparatus of example 32, where the loop filter is an adaptive loop filter (ALF).

Example 34. The apparatus of example 32, where the at least one pixel of the first block or the at least one pixel of the additional block of the first slice comprise one or more pixels of a slice closest to the second block.

Example 35. The apparatus of example 32, where the first slice is L-shaped and the second block is located at a bottom-right corner of the first block.

Example 36. The apparatus of example 35, where the at least one pixel of the first block or the at least one pixel of the additional block of the first slice comprise one or more pixels of a left-neighboring block (in the first slice) of the second block closest to the second block.

Example 37. The apparatus of example 35, where the at least one pixel of the first block or the at least one pixel of the additional block of the first slice comprise one or more pixels of a top-neighboring block (in the first slice) of the second block closest to the second block.

Example 38. The apparatus of example 35, where the at least one pixel of the first block or the at least one pixel of the additional block of the first slice comprise one or more pixels of a left-neighboring block (in the first slice) of the second block closest to the second block and one or more pixels of a top-neighboring block (in the first slice) of the second block closest to the second block.

Example 39. The apparatus of example 32, where the first block comprises a first coding tree unit (CTU) and the second block comprises a second CTU.

Example 40. The apparatus of example 32, where the first slice and the second slice are obtained from raster scan partitioning of the picture.

Example 41. The apparatus of example 32, the one or more processors being configured to: generate an encoded video bitstream comprising the one or more pictures.

Example 42. The apparatus of example 41, where the encoded video bitstream is generated based on the video data and a result of applying the at least one filter to the block.

Example 43. The apparatus of example 41, the one or more processors being configured to: store the encoded video bitstream.

Example 44. The apparatus of any of examples 32 through 43, where the apparatus is a mobile computing device.

Example 45. A non-transitory computer-readable storage medium comprising:

instructions stored thereon which, when executed by one or more processors, cause the one or more processors to: obtain a first block of a picture from the one or more pictures, the first block being located in a first slice of the picture; determine a second block is located in a second slice of the picture, the second block including one or more pixels for use in performing loop filtering of a pixel of the first block; determine loop filtering across slice boundaries is disabled;

determine, based on the second block being located in the second slice and the loop filtering across slice boundaries being disabled, that the one or more pixels of the second block are unavailable for performing loop filtering of the pixel of the first block; and duplicate, based on the one or more pixels of the second block being unavailable for performing loop filtering of the pixel of the first block, at least one pixel of the first block or at least one pixel of an additional block of the first slice for performing loop filtering of the pixel of the first block.

Example 46: An apparatus comprising a memory configured to store video data and a processor configured to process the video data according to any of Examples 52 to 60.

Example 47: An apparatus according to Example 45, where the apparatus includes a decoder.

Example 48: An apparatus according to Example 45, where the apparatus includes an encoder.

Example 49: An apparatus according to any example above, where the apparatus is a mobile device.

Example 50: An apparatus according to any example above, further comprising a display configured to display the video data.

Example 51: An apparatus according to any example above, further comprising a camera configured to capture one or more pictures.

Example 52: A computer readable medium having stored thereon instructions that when executed by a processor perform a method according to any example above.

What is claimed is:

1. A method of processing video data, the method comprising:
    obtaining video data comprising one or more pictures;
    obtaining a first block of a picture from the one or more pictures, the first block being located in a first slice of the picture, wherein the first slice is a raster scan slice;
    determining one or more pixels of a second block are located in a second slice of the picture, the one or more pixels for use in performing loop filtering of a pixel of the first block, wherein the second block is located diagonally adjacent to a bottom-right corner of the first block;
    determining loop filtering across slice boundaries is disabled;
    determining, based on the one or more pixels of the second block being located in the second slice and the loop filtering across slice boundaries being disabled, that the one or more pixels of the second block are unavailable for use in performing loop filtering of the pixel of the first block; and
    duplicating, for each pixel of the one or more pixels of the second block determined to be unavailable for use in performing loop filtering of the pixel of the first block, a respective pixel of a left-neighboring block closest to the second block for use in performing loop filtering of the pixel of the first block, the left-neighboring block being located in the first slice.

2. The method of claim 1, wherein loop filtering for the first block is performed using an adaptive loop filter (ALF).

3. The method of claim 1, further comprising:
    duplicating, for one or more pixels of an additional block determined to be unavailable for performing loop filtering of an additional pixel of the first block, one or more pixels of a top-neighboring block closest to the additional block, the top-neighboring block being located in the first slice.

4. The method of claim 1, further comprising:
    duplicating, for one or more pixels of an additional block determined to be unavailable for performing loop filtering of an additional pixel of the first block, one or more pixels of the left-neighboring block and one or more pixels of a top-neighboring block closest to the additional block, the top-neighboring block being located in the first slice.

5. The method of claim 1, wherein the first block comprises a first coding tree unit (CTU) and the second block comprises a second CTU.

6. The method of claim 1, wherein the first slice and the second slice are obtained from raster scan partitioning of the picture.

7. The method of claim 1, further comprising:
    generating an encoded video bitstream comprising the one or more pictures.

8. The method of claim 7, wherein the encoded video bitstream is generated based on the video data and a result of applying at least one filter to the first block.

9. The method of claim 7, further comprising:
    sending the encoded video bitstream to a decoding device, the encoded video bitstream being sent with signaling information, the signaling information comprising at least a clip flag and an adaptive loop filter flag.

10. The method of claim 7, further comprising:
    storing the encoded video bitstream.

11. The method of claim 1, further comprising:
    obtaining an encoded video bitstream comprising the one or more pictures;
    identifying signaling information associated with the encoded video bitstream, the signaling information comprising at least an adaptive loop filter flag and an indication that the loop filtering across slice boundaries is disabled; and
    decoding the first block of the picture from the encoded video bitstream.

12. The method of claim 11, wherein decoding the first block of the picture from the encoded video bitstream comprises reconstructing the first block of the picture, and further comprising applying at least one filter to the reconstructed first block.

13. An apparatus comprising:
    memory; and
    one or more processors coupled to the memory, the one or more processors being configured to:
        obtain video data comprising one or more pictures;
        obtain a first block of a picture from the one or more pictures, the first block being located in a first slice of the picture, wherein the first slice is a raster scan slice;
        determine one or more pixels of a second block are located in a second slice of the picture, the second block including one or more pixels for use in performing loop filtering of a pixel of the first block, wherein the second block is located diagonally adjacent to a bottom-right corner of the first block;
        determine loop filtering across slice boundaries is disabled;
        determine, based on the one or more pixels of the second block being located in the second slice and the loop filtering across slice boundaries being disabled, that the one or more pixels of the second block are unavailable for use in performing loop filtering of the pixel of the first block; and
        duplicate, for each pixel of the one or more pixels of the second block determined to be unavailable for use in performing loop filtering of the pixel of the first block, a respective pixel of a left-neighboring block closest to the second block for use in performing loop filtering of the pixel of the first block, the left-neighboring block being located in the first slice.

14. The apparatus of claim 13, wherein the one or more processors are configured to:
perform loop filtering for the first block using an adaptive loop filter (ALF).

15. The apparatus of claim 13, wherein the one or more processors are configured to:
duplicate, for one or more pixels of an additional block determined to be unavailable for performing loop filtering of an additional pixel of the first block, one or more pixels of a top-neighboring block closest to the additional block, the top-neighboring block being located in the first slice.

16. The apparatus of claim 13, wherein the one or more processors are configured to:
duplicate, for one or more pixels of an additional block determined to be unavailable for performing loop filtering of an additional pixel of the first block, one or more pixels of the left-neighboring block and one or more pixels of a top-neighboring block closest to the additional block, the top-neighboring block being located in the first slice.

17. The apparatus of claim 13, wherein the first block comprises a first coding tree unit (CTU) and the second block comprises a second CTU.

18. The apparatus of claim 13, wherein the first slice and the second slice are obtained from raster scan partitioning of the picture.

19. The apparatus of claim 13, wherein the one or more processors are configured to:
generate an encoded video bitstream comprising the one or more pictures.

20. The apparatus of claim 19, wherein the encoded video bitstream is generated based on the video data and a result of applying at least one filter to the first block.

21. The apparatus of claim 19, wherein the one or more processors are configured to:
store the encoded video bitstream.

22. The apparatus of claim 19, wherein the apparatus is a mobile computing device.

23. A non-transitory computer-readable storage medium comprising instructions stored thereon which, when executed by one or more processors, cause the one or more processors to:
obtain video data comprising one or more pictures;
obtain a first block of a picture from the one or more pictures, the first block being located in a first slice of the picture, wherein the first slice is a raster scan slice;
determine one or more pixels of a second block are located in a second slice of the picture, the second block including one or more pixels for use in performing loop filtering of a pixel of the first block, wherein the second block is located diagonally adjacent to a bottom-right corner of the first block;
determine loop filtering across slice boundaries is disabled;
determine, based on the one or more pixels of the second block being located in the second slice and the loop filtering across slice boundaries being disabled, that the one or more pixels of the second block are unavailable for use in performing loop filtering of the pixel of the first block; and
duplicate, for each pixel of the one or more pixels of the second block determined to be unavailable for use in performing loop filtering of the pixel of the first block, a respective pixel of a left-neighboring block closest to the second block for use in performing loop filtering of the pixel of the first block, the left-neighboring block being located in the first slice.

24. The non-transitory computer-readable storage medium of claim 23, further comprising instructions which, when executed by the one or more processors, cause the one or more processors to:
duplicate, for one or more pixels of an additional block determined to be unavailable for performing loop filtering of an additional pixel of the first block, one or more pixels of a top-neighboring block closest to the additional block, the top-neighboring block being located in the first slice.

25. The non-transitory computer-readable storage medium of claim 23, further comprising instructions which, when executed by the one or more processors, cause the one or more processors to:
duplicate, for one or more pixels of an additional block determined to be unavailable for performing loop filtering of an additional pixel of the first block, one or more pixels of the left-neighboring block and one or more pixels of a top-neighboring block closest to the additional block, the top-neighboring block being located in the first slice.

26. The non-transitory computer-readable storage medium of claim 23, wherein the first block comprises a first coding tree unit (CTU) and the second block comprises a second CTU.

27. The non-transitory computer-readable storage medium of claim 23, wherein the first slice and the second slice are obtained from raster scan partitioning of the picture.

28. The non-transitory computer-readable storage medium of claim 23, further comprising instructions which, when executed by the one or more processors, cause the one or more processors to:
generate an encoded video bitstream comprising the one or more pictures.

29. The non-transitory computer-readable storage medium of claim 23, further comprising instructions which, when executed by the one or more processors, cause the one or more processors to:
obtain an encoded video bitstream comprising the one or more pictures;
identify signaling information associated with the encoded video bitstream, the signaling information comprising at least an adaptive loop filter flag and an indication that the loop filtering across slice boundaries is disabled; and
decode the first block of the picture from the encoded video bitstream.

* * * * *